US012163365B2

(12) United States Patent
Mortland

(10) Patent No.: US 12,163,365 B2
(45) Date of Patent: Dec. 10, 2024

(54) ARTICULATED HINGE ASSEMBLY FOR AN AIRCRAFT DOOR

(71) Applicant: The Boeing Company, Arlington, VA (US)

(72) Inventor: Michael T. Mortland, Mukilteo, WA (US)

(73) Assignee: The Boeing Company, Arlington, VA (US)

( * ) Notice: Subject to any disclaimer, the term of this patent is extended or adjusted under 35 U.S.C. 154(b) by 78 days.

(21) Appl. No.: 18/183,228

(22) Filed: Mar. 14, 2023

(65) Prior Publication Data
US 2024/0309686 A1 Sep. 19, 2024

(51) Int. Cl.
*E05D 3/06* (2006.01)
*B64C 1/14* (2006.01)

(52) U.S. Cl.
CPC .............. *E05D 3/06* (2013.01); *B64C 1/1423* (2013.01); *E05Y 2201/21* (2013.01);
(Continued)

(58) Field of Classification Search
CPC ........... E05D 7/04; E05D 7/06; E05D 7/0407; E05D 7/0415; E05D 7/009; E05D 3/186; E05D 3/06; E05D 3/122; E05D 3/12; E05D 3/14; E05D 3/16; E05D 2003/163; E05D 11/06; E05D 5/0276; E05Y 2201/618; E05Y 2201/62; E05Y 2201/71; E05Y 2201/716; E05Y 2201/712; E05Y 2900/20;
(Continued)

(56) References Cited

U.S. PATENT DOCUMENTS 5,289,615 A * 3/1994 Banks ................ E05D 3/122
244/905
6,685,139 B2 * 2/2004 Blum .................... B64C 1/1407
49/246
(Continued)

FOREIGN PATENT DOCUMENTS

DE 102018130527 B3 1/2020
EP 317037 A * 5/1989 ........... B64C 1/1407
(Continued)

OTHER PUBLICATIONS

Search Report and Written Opinion for corresponding EP Application No. 26160993 dated Jun. 24, 2024 (6 pages).

*Primary Examiner* — Chuck Y Mah
(74) *Attorney, Agent, or Firm* — Jay J. Hoette; The Small Patent Law Group, LLC

(57) ABSTRACT

An articulated hinge assembly for connecting a door to a fuselage of an aircraft includes an articulated hinge arm having a first hinge member pivotably coupled to a second hinge member at an elbow. A fuselage fitting is pivotably coupled to a fuselage bracket and a door fitting is pivotably coupled to a door bracket of the door. The articulated hinge arm is movable from a collapsed position to an expanded position to move the door from a door closed position to a door open position. The articulated hinge assembly includes a linkage assembly coupled to the articulated hinge arm, the fuselage fitting and the door fitting controlling movement of the first hinge member and the second hinge member relative to each other and relative to the fuselage fitting. The linkage assembly controls positioning of the door.

20 Claims, 11 Drawing Sheets

(52) U.S. Cl.
CPC ... *E05Y 2201/254* (2013.01); *E05Y 2201/456* (2013.01); *E05Y 2201/624* (2013.01); *E05Y 2201/686* (2013.01); *E05Y 2900/502* (2013.01)

(58) Field of Classification Search
CPC ......... E05Y 2900/502; E05Y 2201/638; E05Y 2201/21; E05Y 2201/254; E05Y 2201/456; E05Y 2201/624; E05Y 2201/686; E05F 3/20; E05F 5/006; B64C 1/1423; B64C 1/1407; B64C 1/1461
See application file for complete search history.

(56) References Cited

U.S. PATENT DOCUMENTS

| | | | | |
|---|---|---|---|---|
| 9,816,302 | B2* | 11/2017 | Shepherd | E05F 5/006 |
| 11,377,192 | B2* | 7/2022 | Heeren | E05D 15/32 |
| 2002/0096602 | A1* | 7/2002 | Dazet | B64C 1/1407 |
| | | | | 244/129.5 |
| 2006/0202087 | A1* | 9/2006 | Mortland | B64C 1/1407 |
| | | | | 244/129.5 |
| 2009/0007375 | A1* | 1/2009 | Frank | E05D 7/0423 |
| | | | | 16/238 |
| 2010/0109497 | A1* | 5/2010 | Blersch | E05F 1/1253 |
| | | | | 312/405 |
| 2011/0204072 | A1* | 8/2011 | Sugasawara | E05D 15/34 |
| | | | | 16/382 |
| 2012/0117884 | A1* | 5/2012 | Oshima | E05D 3/18 |
| | | | | 16/362 |
| 2013/0227819 | A1 | 9/2013 | Frank et al. | |
| 2013/0256458 | A1* | 10/2013 | Kress | B64C 1/1423 |
| | | | | 244/129.5 |
| 2016/0083071 | A1* | 3/2016 | Pichlmaier | B64C 1/1423 |
| | | | | 92/76 |
| 2019/0002077 | A1 | 1/2019 | Kijak et al. | |
| 2020/0070947 | A1 | 5/2020 | Heeren | |
| 2021/0332624 | A1* | 10/2021 | Means | E05D 7/009 |
| 2022/0348304 | A1 | 11/2022 | Capron et al. | |

FOREIGN PATENT DOCUMENTS

| | | | | |
|---|---|---|---|---|
| EP | | 0512588 A1 * | 11/1992 | |
| WO | WO-2020253987 A1 * | 12/2020 | ............. | B64C 1/143 |

* cited by examiner

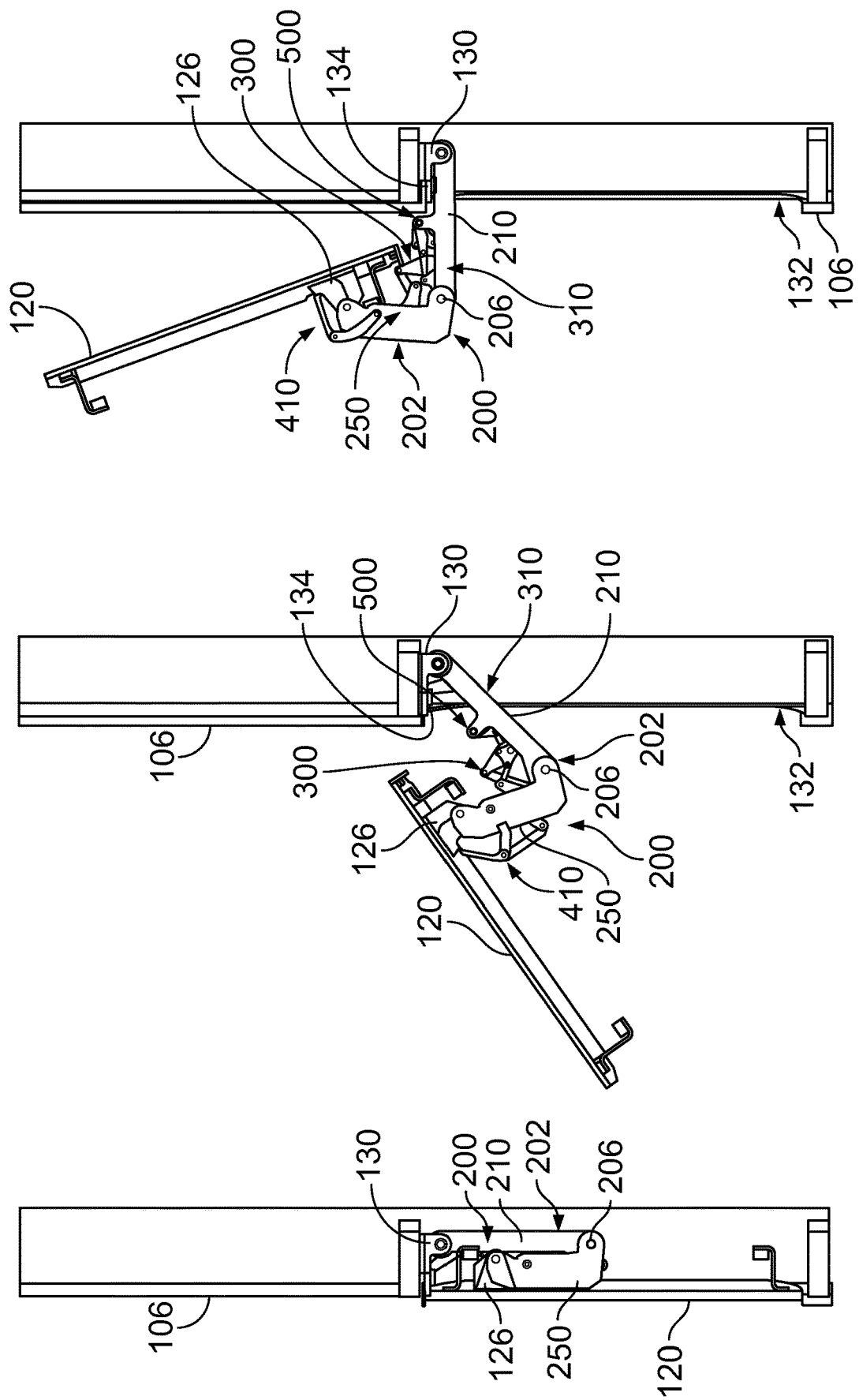

ARTICULATED HINGE ASSEMBLY FOR AN AIRCRAFT DOOR

BACKGROUND

The subject matter herein relates generally to aircraft doors.

An important part of any door assembly is the hinge assembly that connects the door to the adjacent aircraft fuselage structure. One particular type of hinge assembly is arranged so that, when the door is opened, the door physically separates from the surrounding structure and is translated out and away from the body while the door itself maintains a relatively parallel orientation to the longitudinal axis of the aircraft fuselage. The hinge also translates the door forward to provide a clear opening into the aircraft as the door swings away from the body. When the door is completely open, the inside face of the door is adjacent the outer skin of the aircraft.

Many hinge assemblies used with translating-motion-type aircraft doors include both a structural hinge for securing the door to the aircraft and a mechanical linkage that provides a second door-to-fuselage connection. The mechanical linkage is employed to control the rotational orientation of the door along its vertical axis so that, as the door is moved away from the fuselage, the door is moved to an open position, such as along the outer skin of the aircraft. If the movement of the door was not controlled, the door would swing free at the end of the hinge and be difficult to maneuver and/or strike the outer skin of the fuselage. The mechanical linkage used in conventional door assemblies is typically bulky and extends a considerable distance into the interior of the fuselage. The space occupied by the mechanical linkage limits availability of such space for other purposes, such as for stowage, seating, or other purposes.

What is needed is a low profile hinge assembly for connecting a door to a fuselage of an aircraft.

BRIEF DESCRIPTION

In one embodiment, an articulated hinge assembly for connecting a door to a fuselage of an aircraft is provided. The articulated hinge assembly includes an articulated hinge arm having a first hinge member and a second hinge member pivotably coupled to the first hinge member at an elbow. The first hinge member includes a fuselage fitting configured to be pivotably coupled to a fuselage bracket mounted to the fuselage adjacent a door opening of the aircraft. The second hinge member includes a door fitting configured to be pivotably coupled to a door bracket of the door. The articulated hinge arm is movable from a collapsed position to an expanded position to move the door from a door closed position to a door open position. The second hinge member is folded in on the first hinge member in the collapsed position. The second hinge member is moved away from the first hinge member in the expanded position. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting as the articulated hinge arm is moved from the collapsed position to the expanded position. The linkage assembly includes a door linkage assembly coupled to the articulated hinge arm and the door to control positioning of the door relative to the second hinge member when the door is moved from the door closed position to the door open position. The linkage assembly configured to cause the door to move along a programed path relative to the fuselage as the door moves from the door closed position to the door open position.

In another embodiment, an articulated hinge assembly for connecting a door to a fuselage of an aircraft is provided. The articulated hinge assembly includes an articulated hinge arm has a first hinge member, a second hinge member, and a connecting shaft. The first and second hinge members are pivotably coupled to the connecting shaft at an elbow. The first hinge member extending between a forward end and an aft end. The aft end of the first hinge member is coupled to the connecting shaft. The first hinge member includes a fuselage fitting at the forward end of the first hinge member configured to be pivotably coupled to a fuselage bracket mounted to the fuselage adjacent a door opening of the aircraft. The second hinge member includes a forward end and an aft end. The aft end of the second hinge member is coupled to the connecting shaft. The second hinge member includes a door fitting at the forward end of the second hinge member configured to be pivotably coupled to a door bracket of the door. The articulated hinge arm movable from a collapsed position to an expanded position to move the door from a door closed position to a door open position. The second hinge member is folded in on the first hinge member in the collapsed position. The second hinge member is moved away from the first hinge member in the expanded position. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting. The hinge linkage assembly includes a hinge pivot arm pivotably coupled to the first hinge member, a hinge connecting arm between the hinge pivot arm and a hinge crank coupled to a drive shaft, and a hinge link arm between the hinge pivot arm and the second hinge member. The hinge pivot arm includes a pivot axis at a first end of the hinge pivot arm. The hinge connecting arm coupled to a central portion of the hinge pivot arm. The hinge link arm coupled to the hinge pivot arm at a second end of the hinge pivot arm. The articulated hinge assembly includes a door linkage assembly coupled to the articulated hinge arm and the door to control positioning of the door relative to the second hinge member when the door is moved from a door closed position to a door open position. The door linkage assembly includes a drive assembly, a door pivot assembly, and a door link assembly. The drive assembly includes a door crank coupled to the drive shaft and is operably coupled to the door pivot assembly. The door pivot assembly is pivotably coupled to the articulated hinge arm. The door link assembly connected between the door pivot assembly and the door bracket. The door pivot assembly includes at least one door pivot arm pivotably coupled to the articulated hinge arm. The door link assembly includes a door link arm connected to the door bracket, a first door link connecting arm connected between the door link arm and the at least one door pivot arm, and a second door link connecting arm connected between the second hinge member and the door link arm. The linkage assembly configured to cause the door to move along a programed path relative to the fuselage as the door moves from the door closed position to the door open position.

In a further embodiment, an articulated hinge assembly for connecting a door to a fuselage of an aircraft is provided. The articulated hinge assembly includes an articulated hinge arm has a first hinge member and a second hinge member pivotably coupled to the first hinge member at an elbow. The first hinge member includes a fuselage fitting configured to be pivotably coupled to a fuselage bracket mounted to the fuselage adjacent a door opening of the aircraft. The second hinge member includes a door fitting configured to be pivotably coupled to a door bracket of the door. The articulated hinge arm movable from a collapsed position to an expanded position to move the door from a door closed position to a door open position. The second hinge member is folded in on the first hinge member in the collapsed position. The second hinge member is moved away from the first hinge member in the expanded position. The articulated hinge assembly includes a linkage assembly coupled to the articulated hinge arm, the fuselage fitting and the door fitting. The linkage assembly includes a hinge linkage assembly coupled to the articulated hinge arm and the fuselage fitting. The hinge linkage assembly controls movement of the first hinge member and the second hinge member relative to each other and relative to the fuselage fitting. The linkage assembly includes a door linkage assembly coupled to the articulated hinge arm and the door to control positioning of the door relative to the second hinge member when the door is moved from a door closed position to a door open position. The linkage assembly configured to cause the door to swing outward along a programed path relative to the fuselage such that an exterior of the door faces an exterior of the fuselage in the door open position.

BRIEF DESCRIPTION OF THE DRAWINGS

FIG. 16 is a top view of the articulated hinge assembly and the linkage assembly in accordance with an exemplary embodiment in the collapsed position corresponding to the door closed position.

FIG. 17 is a top view of the articulated hinge assembly and the linkage assembly in accordance with an exemplary embodiment in a partially expanded or partially collapsed position.

FIG. 18 is a top view of the articulated hinge assembly and the linkage assembly in accordance with an exemplary embodiment in the expanded position corresponding to the door open position.

DETAILED DESCRIPTION

Figure 1:
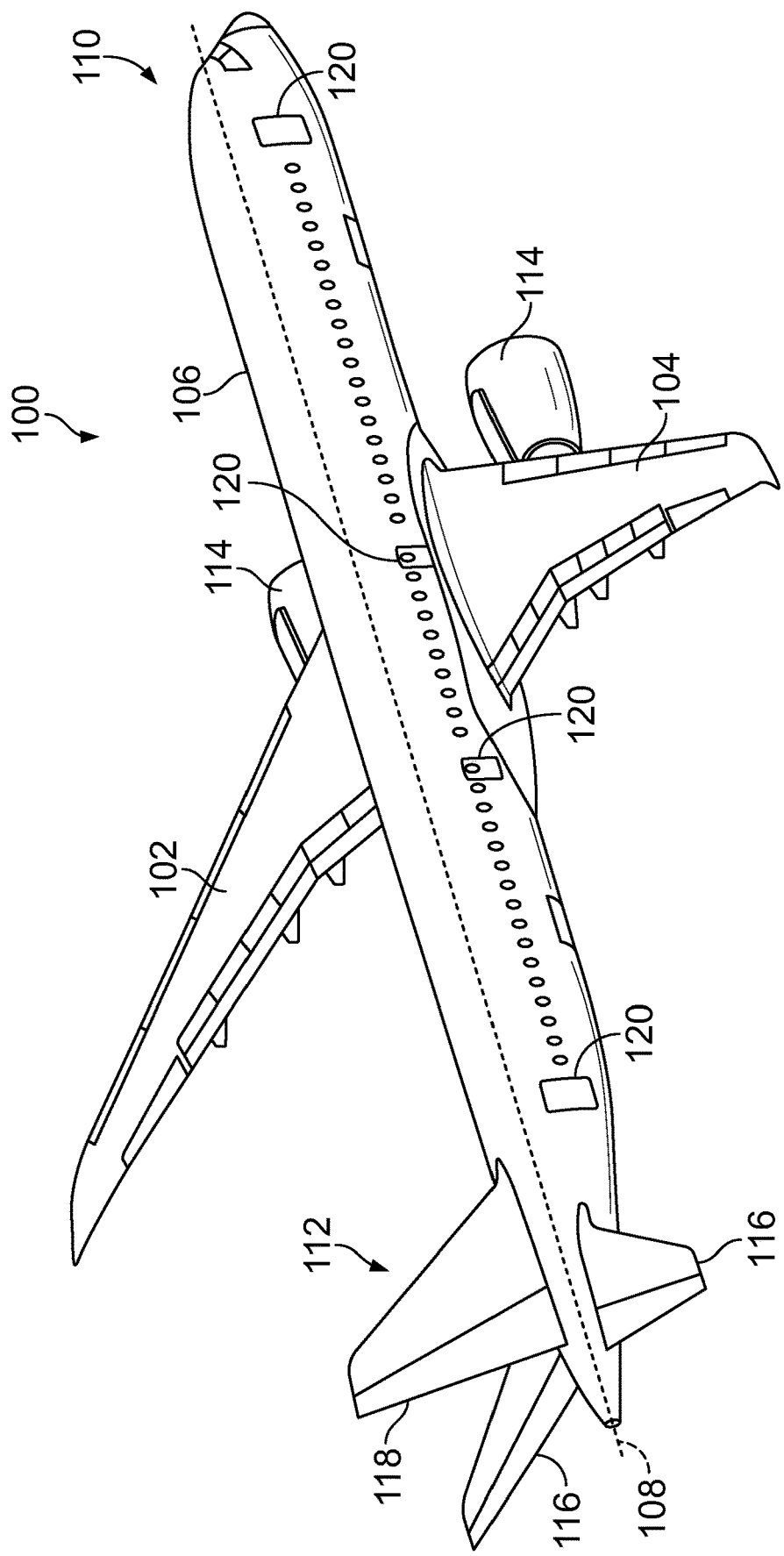
FIG. 1 illustrates an aircraft 100 in accordance with an exemplary embodiment.

FIG. 1 illustrates an aircraft 100 in accordance with an exemplary embodiment. The aircraft 100 has wings 102, 104 attached to a fuselage 106. The fuselage 106 extends along a longitudinal axis 108 between a nose section 110 at the front of the aircraft 100 and a tail section 112 at the rear of the aircraft 100. The aircraft 100 includes engines 114 attached to the wings 102, 104. The fuselage 106 has horizontal stabilizers 116 and a vertical stabilizer 118 at the tail section 112.

A passenger cabin is present in the fuselage 106 of the aircraft 100. The passenger cabin is part of a pressure-controlled interior in fuselage 106 of aircraft 100. Doors 120 are present in fuselage 106 to provide access to the passenger cabin. The doors 120 may be passenger entry/exit doors used for loading and unloading passengers. The doors 120 may be emergency doors, such as over the wings 102, 104. One or more of the doors 120 are attached to the fuselage 106 using articulated hinge assemblies 200 (shown in FIGS. 2 and 3) in accordance with exemplary embodiments.

Figure 2:
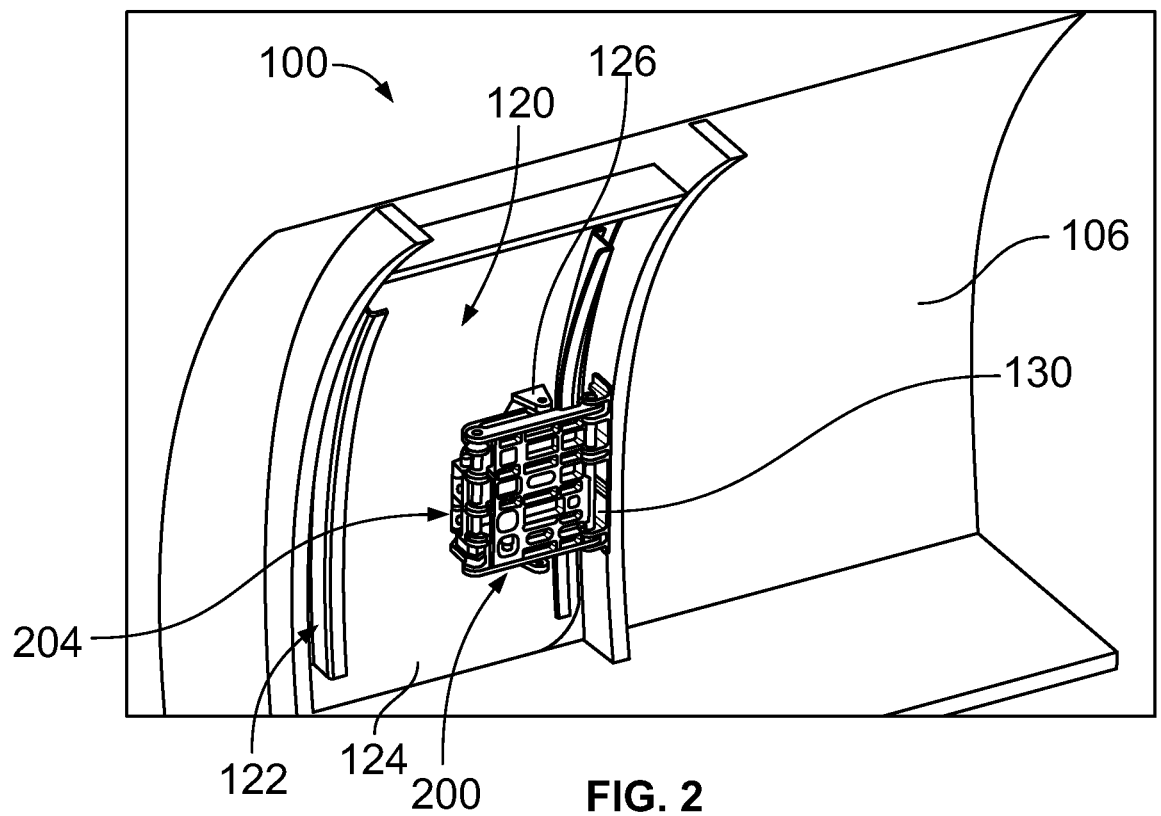
FIG. 2 illustrates an articulated hinge assembly in accordance with an exemplary embodiment showing the door in a door closed position.
Figure 3:
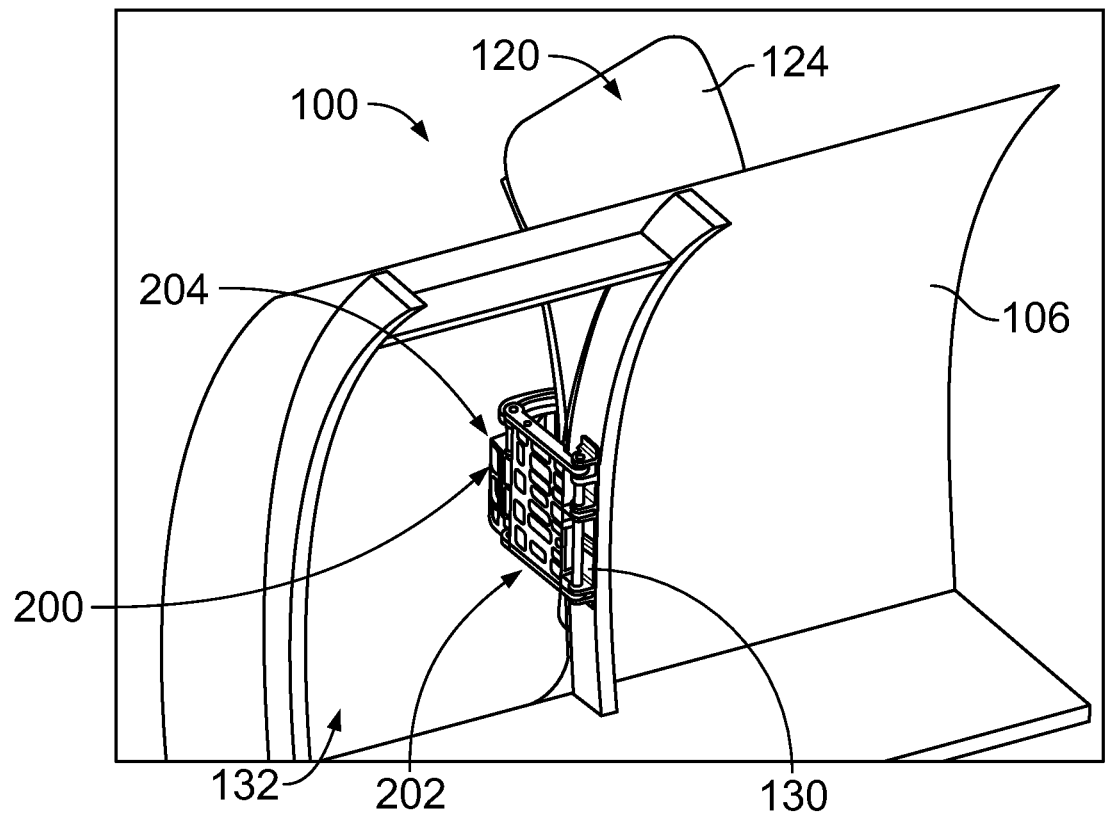
FIG. 3 illustrates the articulated hinge assembly in accordance with an exemplary embodiment showing the door in a door open position.
Figure 4:
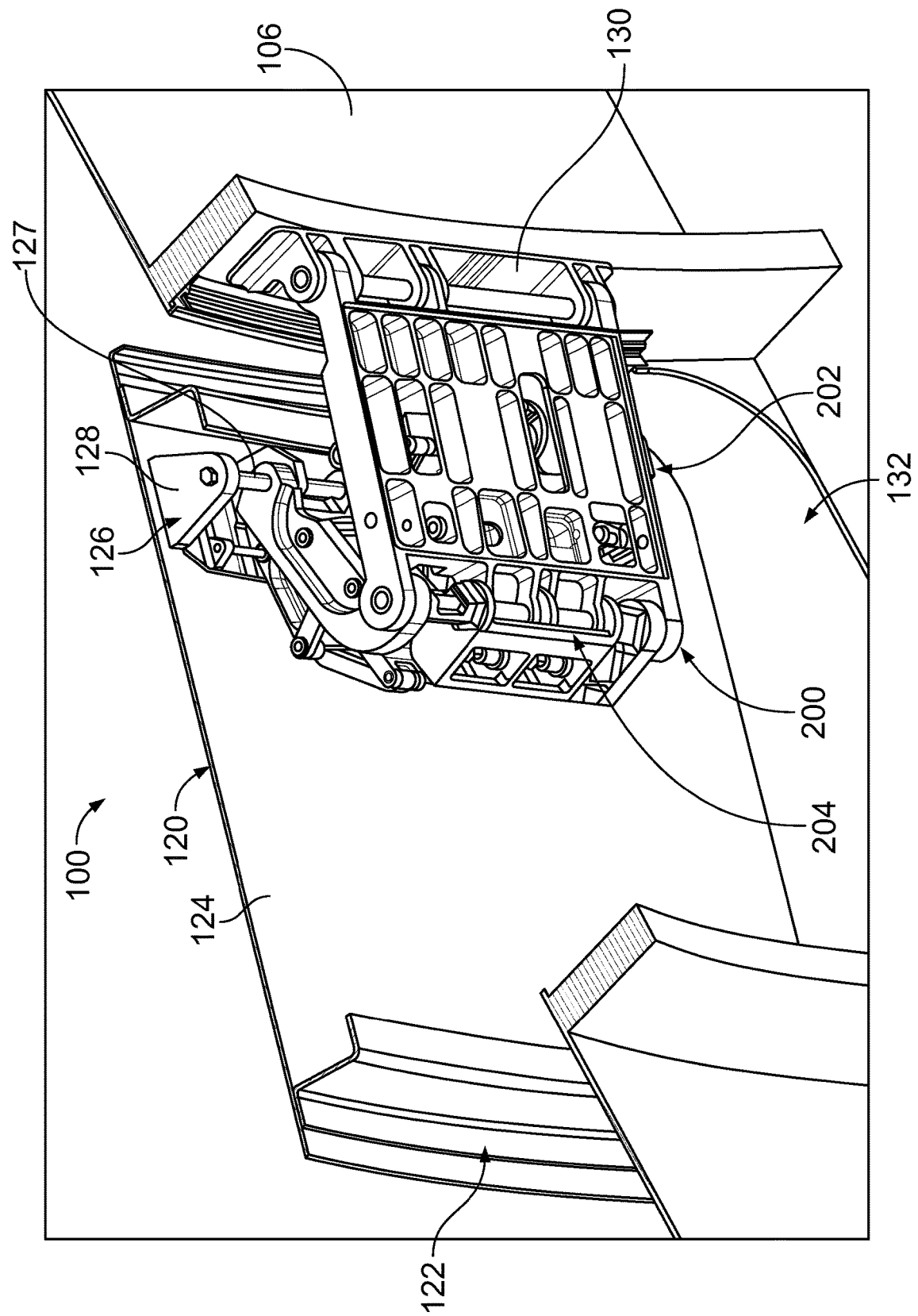
FIG. 4 illustrates the articulated hinge assembly in accordance with an exemplary embodiment showing the door in a partially open or partially closed position.

FIG. 2 illustrates an articulated hinge assembly 200 in accordance with an exemplary embodiment showing the door 120 in a door closed position. FIG. 3 illustrates the articulated hinge assembly 200 in accordance with an exemplary embodiment showing the door 120 in a door open position. FIG. 4 illustrates the articulated hinge assembly 200 in accordance with an exemplary embodiment showing the door 120 (shown in section) in a partially open or partially closed position. The articulated hinge assembly 200 is used for connecting the door 120 to the fuselage 106 of the aircraft 100. The articulated hinge assembly 200 is articulated and capable of folding or bending as the door 120 is moved between the door closed position and the door open position. For example, the articulated hinge assembly 200 may be in a folded or collapsed position in the door closed position and in an expanded position in the door open position. The articulated hinge assembly 200 causes the door 120 to swing outward along a programmed path from the door closed position to the door open position. In an exemplary embodiment, the exterior of the door 120 faces an exterior of the fuselage 106 in the door open position.

The door 120 includes a door frame structure 122 and a door skin 124. An interior lining or interior cosmetic panel (not shown) is removed to illustrate the door structure 122 and the articulated hinge assembly 200. The door structure 122 may include vertical frame members, such as at the exterior or edge, and horizontal beam members across the interior to form the door structure 122.

The articulated hinge assembly 200 includes components which allow it to perform in its intended manner. Many of these components are common to mechanical systems, such as pins, fasteners, brackets and the like. The following description shall describe selected components and their arrangement and combination needed to understand the structure and operation of the articulated hinge assembly 200.

The articulated hinge assembly 200 includes an articulated hinge arm 202, which provides the structural support member that connects the door 120 to the fuselage 106. The articulated hinge arm 202 pivots at both ends (for example, at the fuselage 106 and at the door 120) and pivots at a central region of the articulated hinge arm 202. The articulated hinge arm 202 supports the door 120 through a range of motion. The articulated hinge arm 202 is articulated at a joint or elbow 204, which may be approximately centered between the connection points with the fuselage 106 and the door 120. The articulated hinge arm 202 bends or folds at the elbow 204 to swing the door 120 outward and forward to the door open position.

The articulated hinge assembly 200 is configured to cause the door 120 to move along a programed path. For example, the articulated hinge assembly 200 may cause the door 120 to move along a sweeping or pivoted path as the door 120 moves from the door closed position to the door open position. When the door 120 is fully opened, the exterior of the door 120 is adjacent to (for example, faces) the outer skin of the aircraft 100.

In the door open position, the articulated hinge arm 202 may be generally L-shaped to position the door 120 outward of the outer skin of the aircraft 100. For example, the hinge members of the articulated hinge arm 202 may be oriented at an angle between 85 and 105 degrees in the door open position. The L-shaped nature of the articulated hinge arm 202 at the elbow 204 accommodates the shape of the fuselage 106 around the door opening in order to position the door 120 close to the fuselage 106 in the door open position. The L-shaped hinge elbow 204 formed by the articulated hinge arm 202 receives a portion of the fuselage 106 around the door opening to position the door close to the outer skin of the fuselage 106 in the door open position.

The articulated hinge assembly 200 is connected to the door structure 122 at a door bracket 126 of the door structure 122. In an exemplary embodiment, the door 120 is pivotably coupled to the door bracket 126 and pivots relative to the door bracket 126 as the door 120 is opened and closed. In various embodiments, the door bracket 126 may be located in an off-set position relative to a center of the door 120, such as being located closer to a forward end of the door 120. The door bracket 126 may be located closer to the bottom of the door 120 in various embodiments. Other locations are possible in alternative embodiments.

The articulated hinge assembly 200 is connected to the fuselage 106 at a fuselage bracket 130 mounted to the fuselage 106 adjacent a door opening 132. A pressure seal (not shown) may surround the door opening 132. The door 120 is used to provide closure to the door opening 132. In an exemplary embodiment, the articulated hinge assembly 200 is pivotably coupled to the fuselage bracket 130 and pivots relative to the fuselage bracket 130 as the door 120 is opened and closed.

Figure 5:
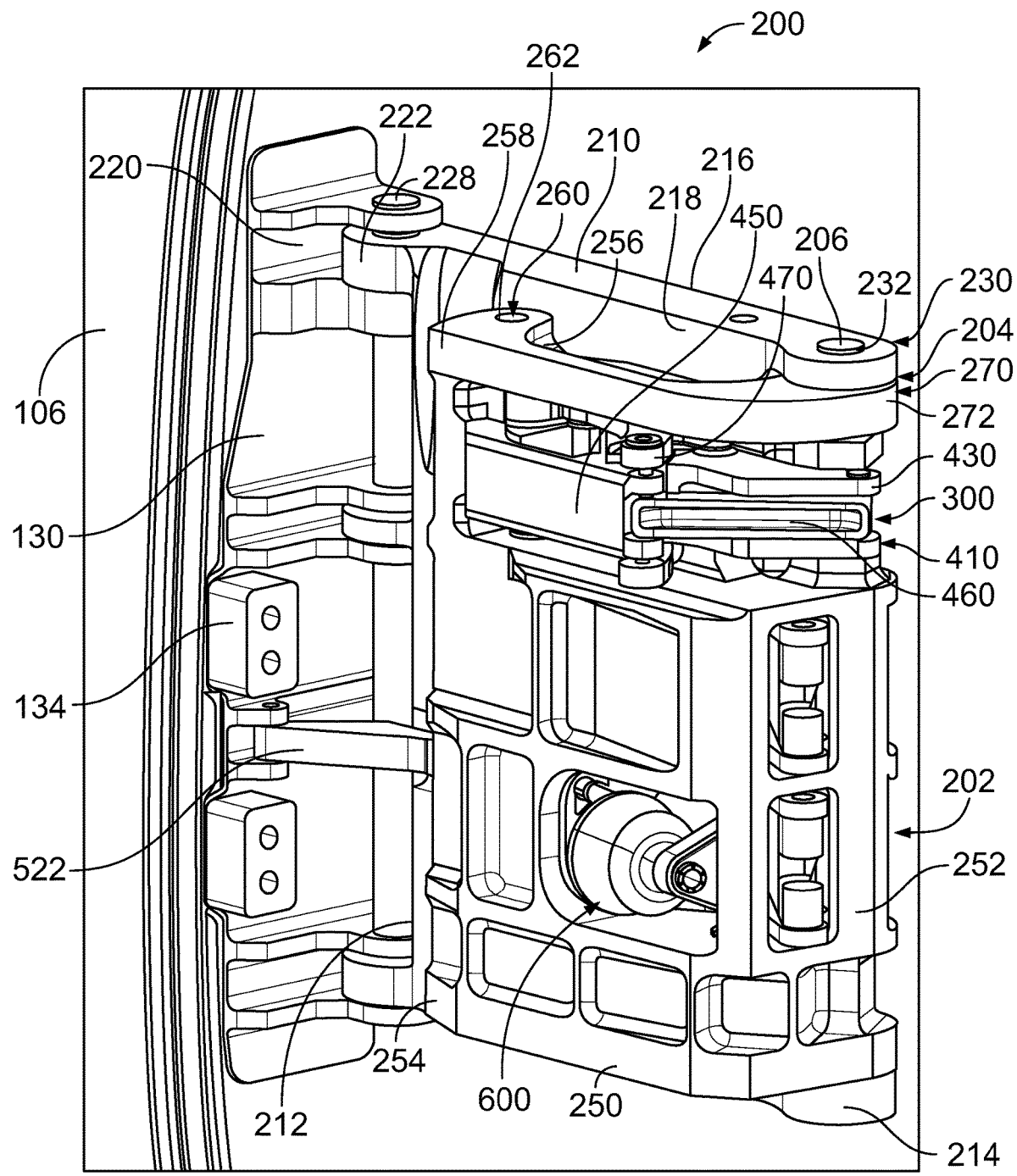
FIG. 5 is a rear perspective view of the articulated hinge assembly in accordance with an exemplary embodiment in a collapsed position corresponding to the door closed position.
Figure 6:
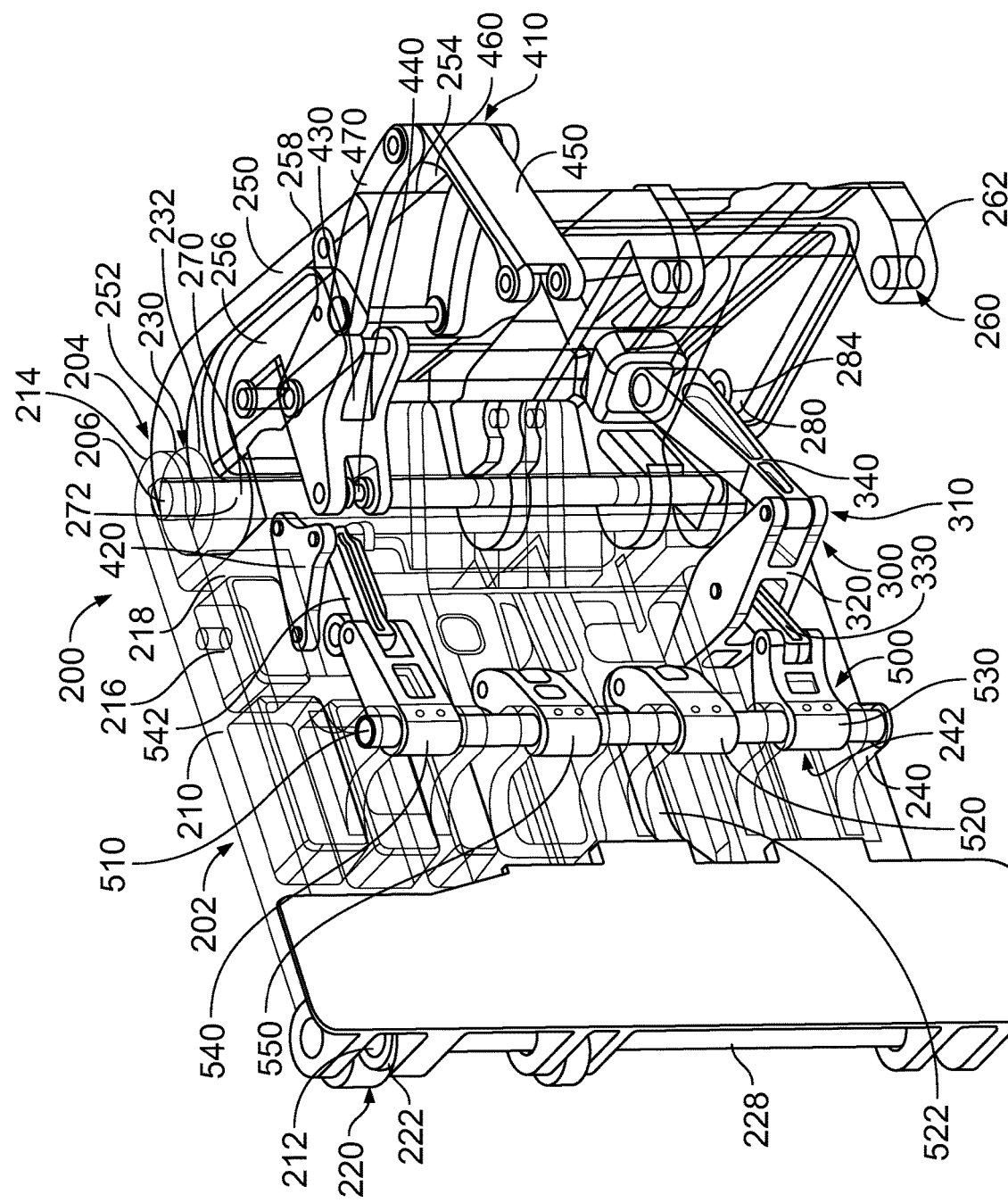
FIG. 6 is a rear perspective view of the articulated hinge assembly in accordance with an exemplary embodiment in an expanded position corresponding to the door open position.

FIG. 5 is a rear perspective view of the articulated hinge assembly 200 in accordance with an exemplary embodiment in a collapsed position corresponding to the door closed position. FIG. 6 is a rear perspective view of the articulated hinge assembly 200 in accordance with an exemplary embodiment in an expanded position corresponding to the door open position. FIG. 5 illustrates the articulated hinge assembly 200 connected to the fuselage 106. FIGS. 5 and 6 have the door removed to illustrate the components of the articulated hinge assembly 200.

The articulated hinge assembly 200 includes the articulated hinge arm 202, a linkage assembly 300 coupled to the articulated hinge arm 202, a drive assembly 500 coupled to the articulated hinge arm 202 and the linkage assembly 300, and an emergency power assist assembly 600 (FIG. 5) attached between the linkage assembly 300 and the articulated hinge arm 202 and operably coupled to the drive assembly 500. The articulated hinge assembly 200 has a low-profile. For example, the linkage assembly 300, the drive assembly 500, and the emergency power assist assembly 600 are generally contained within the envelope or space of the articulated hinge arm 202 and do not occupy significant space outside of the articulated hinge arm 202, thus leaving such space for other aircraft components within the passenger cabin (for example, for passenger seating or galley workspace).

The emergency power assist assembly 600 is used to assist opening of the door 120 in an emergency. For example, the emergency power assist assembly 600 includes a power driven actuator used to push against the door 120 in an opening direction to assist opening the door 120 in an emergency. The emergency power assist assembly 600 may be used to limit the speed of the motion of the articulated hinge arm 202 when the articulated hinge arm 202 is moved between the door closed position to the door open position (for example, to dampen the opening speed or the closing speed).

The linkage assembly 300 is configured to allow the articulated hinge arm 202 to pivot around the fuselage bracket 130 (FIG. 4) when the door 120 is moved from the door closed position to the door open position. The linkage assembly 300 is configured to cause the door 120 to move along a programed path, such as a swinging or sweeping path as the door 120 moves from the door closed position to the door open position. The linkage assembly 300 controls the orientation of the door 120 through the opening/closing movements. The geometry of the components of the linkage assembly 300 has been tailored to yield a desired or controlled motion (i.e., Programmed). The sizing, positioning, and orientations of the components of the linkage assembly 300 contribute to the programmability of hinge assembly 200. For example, the connection points between the linkages and the hinge members control the orientations of the hinge members relative to each other and relative to the fuselage as well as control the orientations of the door relative to the hinge members. The rotational and translational motions of the components of the linkage assembly 300 are transmitted through the various components to control the opening and closing of the door 120 relative to the fuselage 106.

The articulated hinge arm 202 includes a first hinge member 210, a second hinge member 250, and a connecting shaft 206 at the elbow 204. The first and second hinge members 210, 250 are pivotably coupled to each other at the connecting shaft 206 to form the elbow 204. The linkage assembly 300 controls movement of the first hinge member 210 relative to the fuselage 106. The linkage assembly 300 controls relative movement between the first hinge member 210 and the second hinge member 250. The linkage assembly 300 controls movement of the door 120 relative to the second hinge member 250.

In an exemplary embodiment, the first hinge member 210 is unitary metal component, such as an aluminum body, manufactured into a desired shape. In various embodiments, the first hinge member 210 is a machined part. The first hinge member 210 may be a determinant part having pre-drilled openings to receive other components, such as the linkage assembly 300. Portions of the metal body are removed to reduce weight of the first hinge member 210.

The first hinge member 210 extends between a forward end 212 and an aft end 214. The first hinge member 210 of the articulated hinge arm 202 includes an interior surface 216 and an exterior surface 218. The exterior surface 218 is configured to face the door 120. In various embodiments, a cosmetic cover or lining (not shown) may be attached to the interior surface 216, which is exposed to the interior of the passenger cabin.

The first hinge member 210 includes a fuselage fitting 220 at the forward end 212. The fuselage fitting 220 is configured to be pivotably coupled to the fuselage bracket 130. In an exemplary embodiment, the fuselage fitting 220 includes lugs 222 having openings that receive bearings (not shown) and a shaft 228 that connects the fuselage fitting 220 to the fuselage bracket 130. Other types of connection elements may be provided at the fuselage fitting 220 to pivotably couple the fuselage fitting 220 to the fuselage bracket 130. In an exemplary embodiment, one or more bumpers 134 are provided between the first hinge member 210 and the fuselage bracket 130 to stop the first hinge member 210 in the door open position. In the illustrated embodiment, the bumpers 134 are coupled to the fuselage bracket 130 and the first hinge member 210 is configured to hit the bumpers 134 and stop in the door open position. However, in alternative embodiments, the bumpers 134 may be coupled to the first hinge member 210 and move with the first hinge member 210 to hit the fuselage bracket 130 to stop the first hinge member 210 in the door open position.

The first hinge member 210 includes a shaft fitting 230 at the aft end 214. The shaft fitting 230 is configured to be pivotably coupled to the connecting shaft 206 at the elbow 204. In an exemplary embodiment, the shaft fitting 230 includes lugs 232 having openings that receive bearings (not shown), which receive the connecting shaft 206. Other types of connection elements may be provided at the shaft fitting 230 to pivotably couple the first hinge member 210 to the second hinge member 250, such as pins.

In an exemplary embodiment, the first hinge member 210 includes mounting brackets 240 (FIG. 6) for mounting the drive assembly 500 to the first hinge member 210. The mounting brackets 240 includes openings that receive the drive assembly 500 to secure the components of the drive assembly 500 to the mounting brackets 240. The drive assembly 500 may be pivotably coupled to the mounting brackets 240. Other types of connection elements may be provided to couple the drive assembly 500 to the first hinge member 210. In various embodiments, the mounting brackets 240 may additionally or alternatively be used to connect the linkage assembly 300 to the first hinge member 210.

In an exemplary embodiment, the second hinge member 250 is unitary metal component, such as an aluminum body, manufactured into a desired shape. In various embodiments, the second hinge member 250 is a machined part. The second hinge member 250 may be a determinant part having predrilled openings to receive other components, such as the linkage assembly 300. Portions of the metal body are removed to reduce weight of the second hinge member 250. In various embodiments, the second hinge member 250 may have similar dimensions (for example, length, width, height) to the first hinge member 210.

The second hinge member 250 extends between an aft end 252 and a forward end 254. The second hinge member 250 of the articulated hinge arm 202 includes an interior surface 256 and an exterior surface 258. In the collapsed position, the exterior surface 258 is configured to face the door 120 and the interior surface 256 faces the first hinge member 210. For example, in the collapsed position, the second hinge member 250 is located between the first hinge member 210 and the door 120.

The second hinge member 250 includes a door fitting 260 at the forward end 254. The door fitting 260 is configured to be pivotably coupled to the door bracket 126 (FIG. 4). In an exemplary embodiment, the door fitting 260 includes lugs 262 having openings that receive bearings (not shown). With reference to FIG. 4, the openings receive a mounting shaft 127 (FIG. 4) held by a mounting bracket 128 (FIG. 4) of the door bracket 126. The mounting shaft 127 connects the door fitting 260 to the mounting bracket 128. The door fitting 260 is rotatable about the mounting shaft 127. In an exemplary embodiment, the mounting shaft 127 is slidable relative to the door fitting 260. For example, the mounting shaft 127 may be vertically slidable on the door fitting 260, such as to accommodate lifting of the door a slight distance during the door opening process. Other types of connection elements may be provided at the door fitting 260 to pivotably couple the door 120 to the door fitting 260.

The second hinge member 250 includes a shaft fitting 270 at the aft end 252. The shaft fitting 270 is configured to be pivotably coupled to the connecting shaft 206 at the elbow 204. In an exemplary embodiment, the shaft fitting 270 includes lugs 272 having openings that receive bearings (not shown), which receive the connecting shaft 206. Other types of connection elements may be provided at the shaft fitting 270 to pivotably couple the second hinge member 250 to the first hinge member 210, such as pins.

In an exemplary embodiment, the second hinge member 250 includes mounting brackets 280 for mounting the linkage assembly 300 to the second hinge member 250. The mounting brackets 280 includes openings 284 that receive pins (not shown) to secure the components of the linkage assembly 300 to the mounting brackets 280. The components of the linkage assembly 300 may be pivotably coupled to the mounting brackets 280 using the pins. Other types of connection elements may be provided to couple the linkage assembly 300 to the second hinge member 250.

Figure 7:
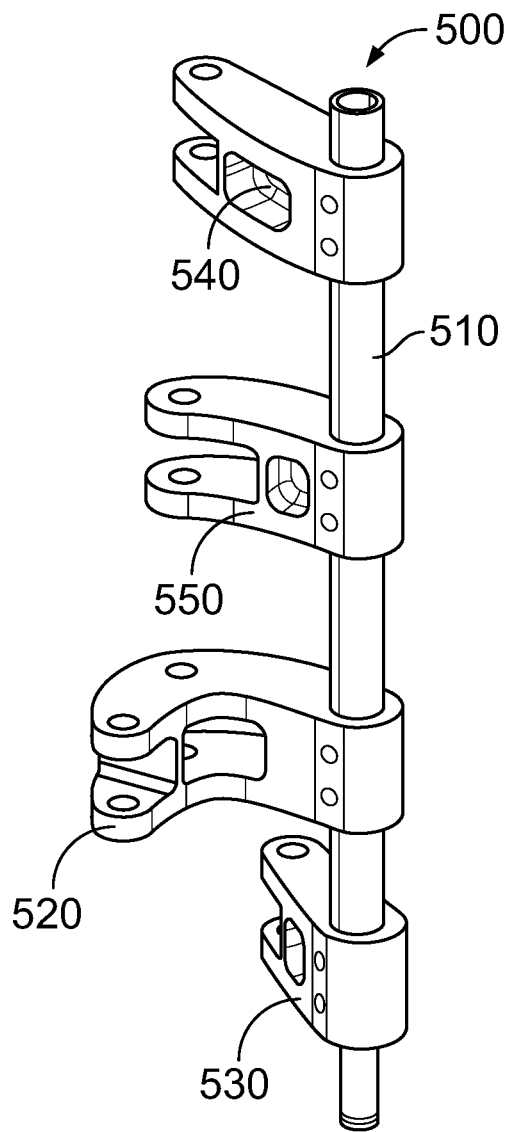
FIG. 7 illustrates the drive assembly including a drive shaft in accordance with an exemplary embodiment.

With additional reference to FIG. 7, which illustrates the drive assembly 500, the drive assembly 500 includes a drive shaft 510. The drive shaft 510 is configured to be coupled to the articulated hinge arm 202. For example, as shown in FIG. 6, the drive shaft 510 is coupled to the first hinge member 210. The drive shaft 510 may be received in the mounting brackets 240 along the exterior surface 218 of the first hinge member 210. In an exemplary embodiment, the linkage assembly 300 is operably coupled to the drive shaft 510. Actuation of the linkage assembly 300 is transferred to the drive shaft 510. Rotation or pivoting of the corresponding linkage of the linkage assembly 300 is transferred to the drive shaft 510 to rotate the drive shaft 510. Such rotation of the drive shaft 510 can force operation of the emergency power assist assembly 600, such as to act as a motion damper.

The drive assembly 500 includes a drive crank 520 coupled to the drive shaft 510 and a drive input link 522 coupled between the drive crank 520 and the fuselage bracket 130. The drive input link 522 causes rotation of the drive crank 520, which is transferred to the drive shaft 510 as the articulated hinge arm 202 is moved from the collapsed position (FIG. 5) to the expanded position (FIG. 6).

The drive assembly 500 includes a hinge assembly crank 530 coupled to the drive shaft 510 and a door assembly crank 540 coupled to the drive shaft 510. The linkage assembly 300 is operably coupled to the hinge assembly crank 530. The linkage assembly 300 moves when driven by rotation of the drive shaft 510 and the hinge assembly crank 530. The linkage assembly 300 is operably coupled to the door assembly crank 540. The linkage assembly 300 moves when driven by rotation of the drive shaft 510 and the door assembly crank 540.

The drive assembly 500 includes a power assist assembly crank 550 coupled to the drive shaft 510. The emergency power assist assembly 600 is operably coupled to the power assist assembly crank 550. The emergency power assist assembly 600 moves when driven by rotation of the drive shaft 510 and the power assist assembly crank 550 and/or the power assist assembly crank 550 and the drive shaft 510 are rotated by the emergency power assist assembly 600, such as during an emergency situation.

In an exemplary embodiment, the emergency power assist assembly 600 is operably coupled to the drive shaft 510 such as through the corresponding crank. Actuation of the emergency power assist assembly 600 is transferred to the drive shaft 510. For example, rotation of the drive shaft 510 by the emergency power assist assembly 600 may be transferred to the linkage assembly 300 to move the articulated hinge arm 202. The input torque from the emergency power assist assembly 600 through the drive shaft 510 pushes the articulated hinge arm 202 open. The emergency power assist assembly 600 can drive the drive shaft 510 and thereby force the linkage assembly 300 to move the articulated hinge arm 202. As the emergency power assist assembly 600 forces the articulated hinge arm 202 to move (open) relative to the door 120, the linkage assembly 300 (which maintains an angular relationship between the fuselage edge frame and the door) causes the door 120 to open out of the cutout. The emergency power assist assembly 600 operates as a force element operable between the articulated hinge arm 202 and the linkage assembly 300. Since there is a rotational coupling (programming linkage set) between the hinge-to-fuselage joint and the door-to-hinge joint, the forceful opening of the joint between the hinge and door via the emergency power assist assembly 600 causes motion between the articulated hinge arm 202 and the fuselage 106 and causes motion between the articulated hinge arm 202 and the door 120 to open the door 120 out of the cutout.

The linkage assembly 300 includes a hinge linkage assembly 310 and a door linkage assembly 410. The hinge linkage assembly 310 is coupled to the articulated hinge arm 202 and the drive assembly 500. The hinge linkage assembly 310 controls movement of the first hinge member 210 and the second hinge member 250 relative to each other. The door linkage assembly 410 is coupled to the articulated hinge arm 202, such as to the first hinge member 210. The door linkage assembly 410 is coupled to the door 120, such as to the door bracket 126. The door linkage assembly 410 is coupled to the drive assembly 500. The door linkage assembly 410 controls positioning of the door 120 relative to the second hinge member 250 when the door 120 is moved from a door closed position to a door open position. The linkage assembly 300 is configured to cause the door 120 to move along a programed path relative to the fuselage 106 as the door 120 moves from the door closed position to the door open position.

In an exemplary embodiment, the hinge linkage assembly 310 includes a plurality of link elements connected to each other and to other components to control movement of the articulated hinge assembly 200. In the illustrated embodiment, the hinge linkage assembly 310 includes a hinge pivot arm 320, a hinge connecting arm 330, and a hinge link arm 340. The hinge pivot arm 320 is pivotably coupled to the first hinge member 210. The hinge connecting arm 330 extends between the hinge pivot arm 320 and the hinge assembly crank 530. The hinge link arm 340 extends between the hinge pivot arm 320 and the second hinge member 250.

In an exemplary embodiment, the door linkage assembly 410 includes a plurality of link elements connected to each other and to other components to control movement of the articulated hinge assembly 200. In the illustrated embodiment, the door linkage assembly 410 includes a door pivot assembly 412 and a door link assembly 414. The door pivot assembly 412 is coupled to the door assembly crank 540, such as via a door crank connecting arm 542, and thus may be operated by rotation of the drive shaft 510. The door link assembly 414 is configured to be coupled to the door 120, such as to the door bracket 126.

In an exemplary embodiment, the door pivot assembly 412 includes a first door pivot arm 420, a second door pivot arm 430, and a door pivot connecting arm 440. The first door pivot arm 420 is pivotably coupled to the first hinge member 210. The second door pivot arm 430 is pivotably coupled to the second hinge member 250. The door pivot connecting arm 440 connects the first and second door pivot arms 420, 430. The door pivot assembly 412 may include greater or fewer linkages in alternative embodiments.

In an exemplary embodiment, the door link assembly 414 includes a door link arm 450, a first door link connecting arm 460, and a second door link connecting arm 470. The door link arm 450 is configured to connected to the door bracket 126. The first door link connecting arm 460 is connected between the door link arm 450 and the second door pivot arm 430. The second door link connecting arm 470 is connected between the door link arm 450 and the second hinge member 250. The door link assembly 414 may include greater or fewer linkages in alternative embodiments.

Figure 8:
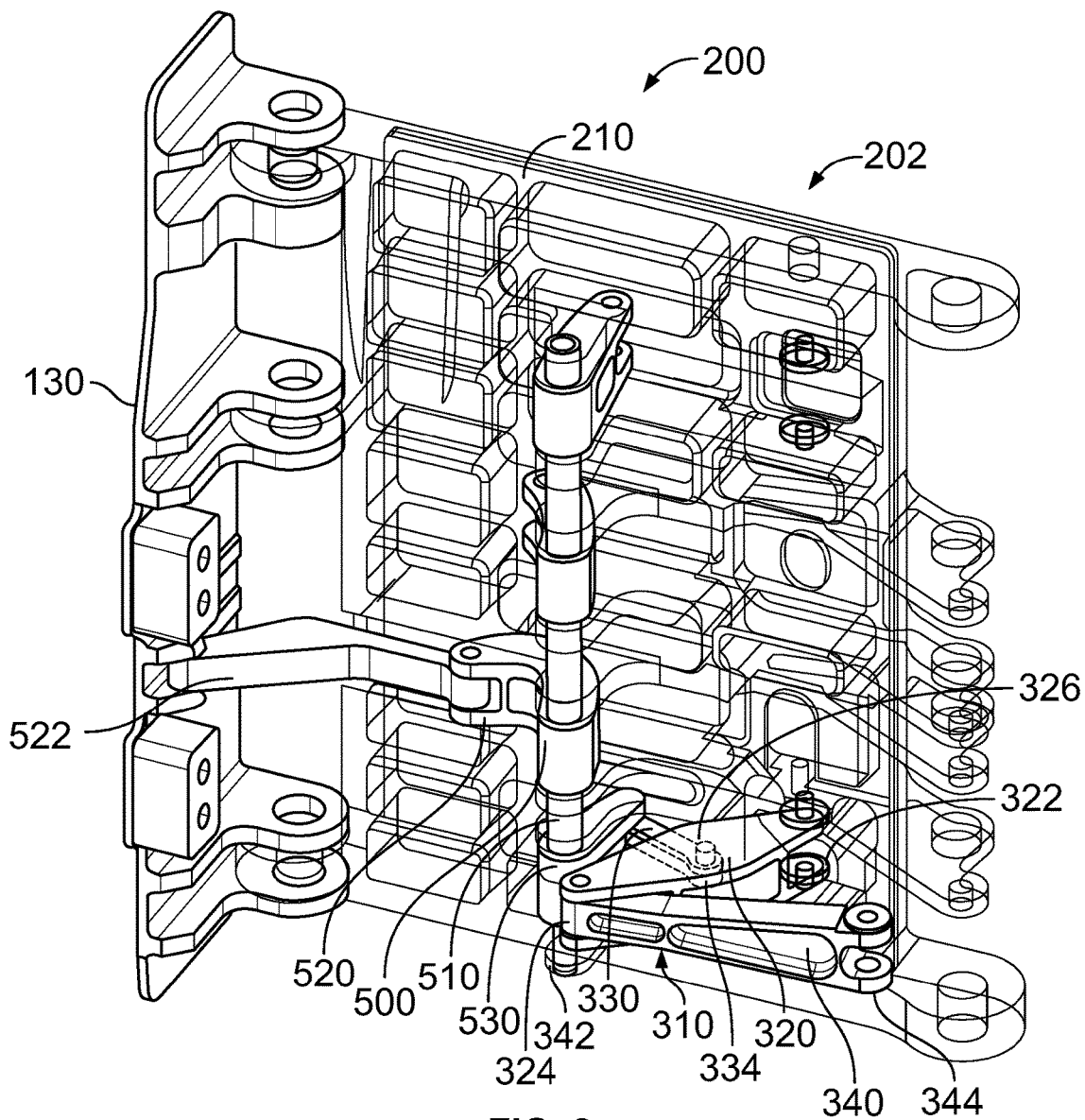
FIG. 8 is a rear perspective view of a portion of the articulated hinge assembly in accordance with an exemplary embodiment showing the drive assembly and the hinge linkage assembly.
Figure 9:
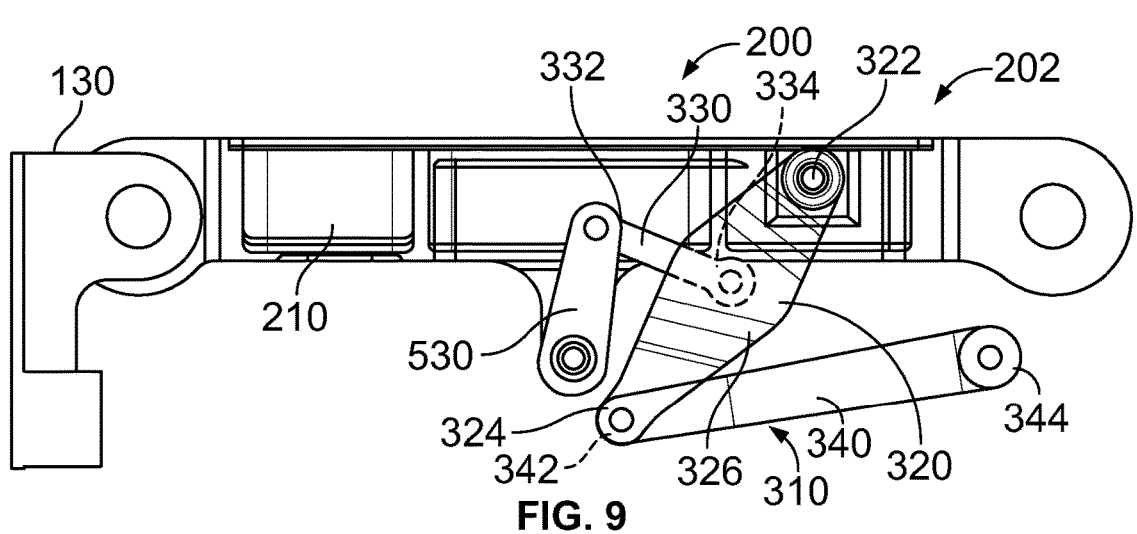
FIG. 9 is a top view of a portion of the articulated hinge assembly in accordance with an exemplary embodiment showing the hinge linkage assembly.

FIG. 8 is a rear perspective view of a portion of the articulated hinge assembly 200 in accordance with an exemplary embodiment showing the drive assembly 500 and the hinge linkage assembly 310. FIG. 9 is a top view of a portion of the articulated hinge assembly 200 in accordance with an exemplary embodiment showing the hinge linkage assembly 310. The hinge linkage assembly 310 is coupled to the drive assembly 500, such as to the hinge assembly crank 530. The hinge linkage assembly 310 is coupled to the articulated hinge arm 202, such as to the first hinge member 210 and the second hinge member 250 (FIG. 6). The hinge linkage assembly 310 controls movement of the first hinge member 210 and the second hinge member 250 relative to each other.

In an exemplary embodiment, the hinge linkage assembly 310 includes the hinge pivot arm 320, the hinge connecting arm 330, and the hinge link arm 340. The drive assembly 500 operates as a force input to the hinge linkage assembly 310, such as to cause movement of the link elements. The hinge connecting arm 330 is connected between the hinge assembly crank 530 and the hinge pivot arm 320. The hinge connecting arm 330 pivots the hinge pivot arm 320. The hinge pivot arm 320, in turn, moves the hinge link arm 340.

The hinge pivot arm 320 extends between a first end 322 and a second end 324. The hinge pivot arm 320 is coupled to the first hinge member 210 at the first end 322. The hinge link arm 340 is coupled to the hinge pivot arm 320 at the second end 324. The hinge pivot arm 320 includes a mounting portion 326. The mounting portion 326 is located between the first and second ends 322, 324. The mounting portion 326 may be approximately centered between the first and second ends 322, 324. The hinge connecting arm 330 is coupled to the hinge pivot arm 320 at the mounting portion 326. When the hinge assembly crank 530 is rotated by the drive shaft 510, the hinge connecting arm 330 pivots the hinge pivot arm 320.

The hinge connecting arm 330 extends between a first end 332 and a second end 334. The first end 332 is coupled to the hinge assembly crank 530, such as by a pin. The hinge connecting arm 330 may pivot relative to the hinge assembly crank 530 during opening or closing of the door. The second end 334 is coupled to the hinge pivot arm 320, such as by a pin. The hinge connecting arm 330 may pivot relative to the hinge pivot arm 320 during opening and closing of the door. In an exemplary embodiment, the hinge connecting arm 330 is linear. However, the hinge connecting arm 330 may have other shapes in alternative embodiments, such as being non-linear or being curved.

The hinge link arm 340 extends between a first end 342 and a second end 344. The first end 342 is coupled to the hinge pivot arm 320, such as by a pin. The hinge link arm 340 may pivot relative to the hinge pivot arm 320 during opening or closing of the door. The second end 344 is configured to be coupled to the second hinge member 250, such as by a pin. The hinge link arm 340 may pivot relative to the second hinge member 250 during opening and closing of the door. In an exemplary embodiment, the hinge link arm 340 is linear. The hinge link arm 340 may have other shapes in alternative embodiments, such as being angular or being curved.

In operation, the hinge linkage assembly 310 controls movement of the first hinge member 210 and the second hinge member 250 relative to each other. For example, as the door is opened, the first hinge member 210 pivots relative to the fuselage bracket 130 and the drive input link 522 forces the drive shaft 510 to rotate via the drive crank 520. The rotation of the drive shaft 510 causes actuation of the hinge linkage assembly 310 to move the second hinge member 250 relative to the first hinge member 210. The first hinge member 210 may pivot approximately 90° from the door closed position to the door open position. The hinge connecting arm 330 pivots the hinge pivot arm 320 as the first hinge member 210 is moved. The hinge link arm 340 is moved by the hinge pivot arm 320. The hinge link arm 340 moves the second hinge member 250 relative to the first hinge member 210. As such, the hinge linkage assembly 310 causes rotation of the second hinge member 250 relative to the first hinge member 210.

Figure 10:
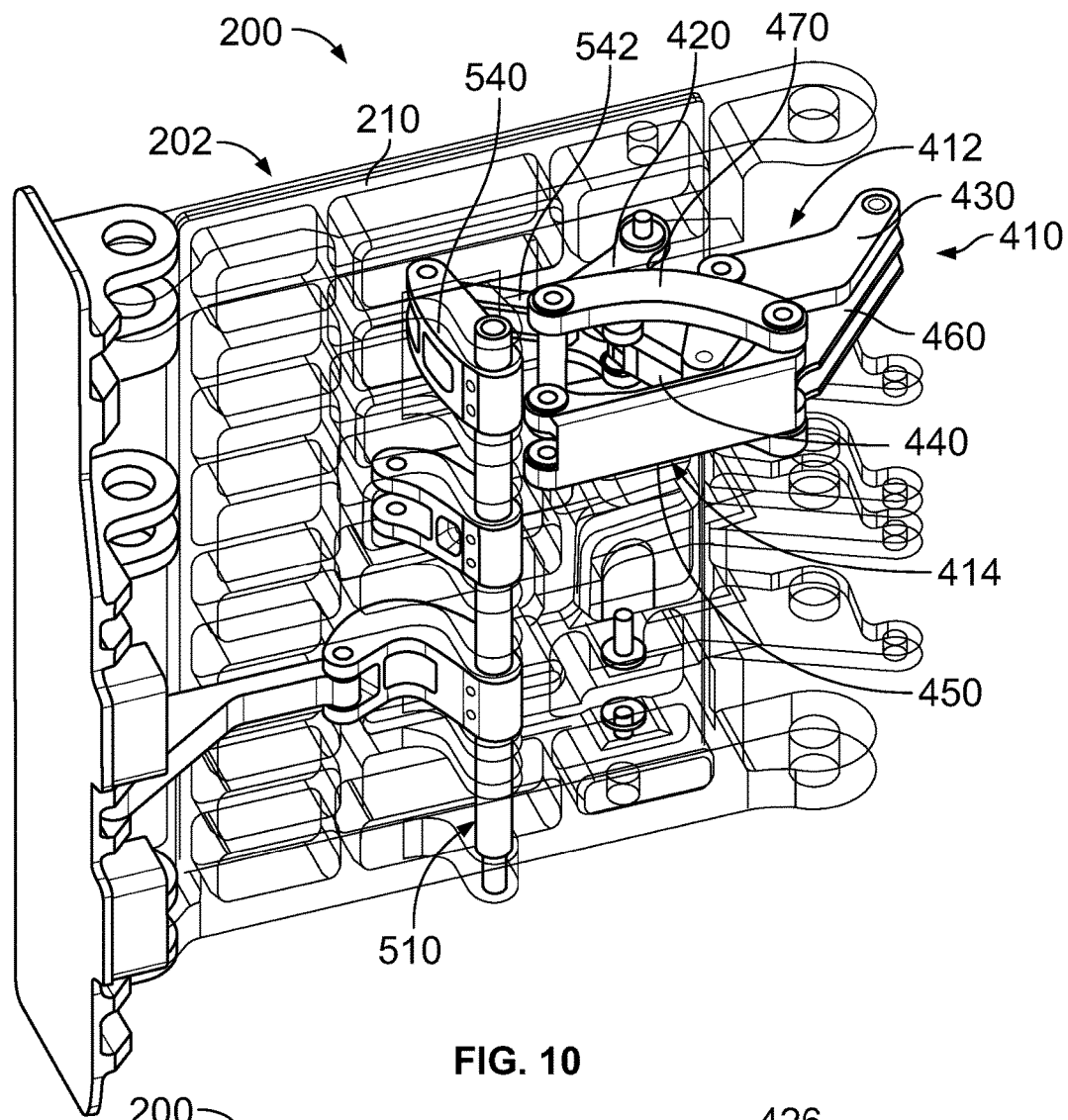
FIG. 10 is a rear perspective view of a portion of the articulated hinge assembly in accordance with an exemplary embodiment showing the door linkage assembly.

FIG. 10 is a rear perspective view of a portion of the articulated hinge assembly 200 in accordance with an exemplary embodiment showing the door linkage assembly 410.

Figure 11:
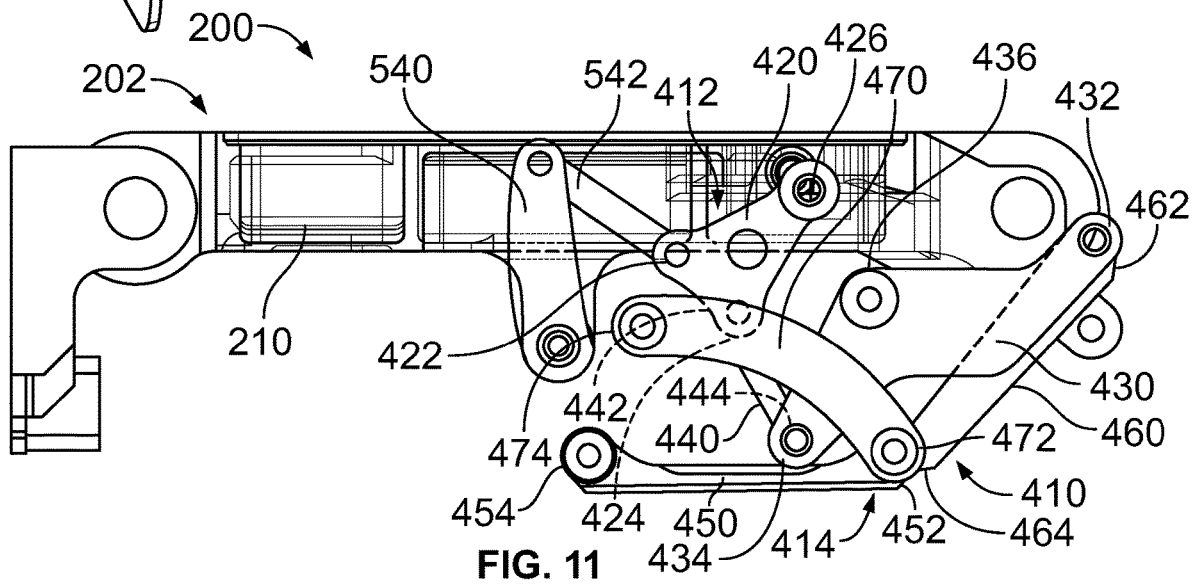
FIG. 11 is a top view of a portion of the articulated hinge assembly in accordance with an exemplary embodiment showing the door linkage assembly.

FIG. 11 is a top view of a portion of the articulated hinge assembly 200 in accordance with an exemplary embodiment showing the door linkage assembly 410. The door linkage assembly 410 is configured to be coupled to the door bracket 126 (shown in FIG. 4). The door linkage assembly 410 is coupled to the articulated hinge arm 202, such as to the first hinge member 210 and the second hinge member 250 (FIG. 6). In an exemplary embodiment, the door linkage assembly 410 is coupled to the drive shaft 510, such as via the door assembly crank 540. The door linkage assembly 410 controls movement of the second hinge member 250 relative to the door bracket 126.

In an exemplary embodiment, the door linkage assembly 410 includes the door pivot assembly 412 and the door link assembly 414. The door pivot assembly 412 is coupled to the door assembly crank 540 via the door crank connecting arm 542. The door pivot assembly 412 includes the first door pivot arm 420, the second door pivot arm 430, and the door pivot connecting arm 440. The door link assembly 414 includes the door link arm 450, the first door link connecting arm 460, and the second door link connecting arm 470. The door assembly crank 540 and the door crank connecting arm 542 operate as a force input to the door linkage assembly 410, such as to cause movement of the other link elements to control movement of the door.

The first door pivot arm 420 extends between a first end 422 and a second end 424. The first end 422 is coupled to the door crank connecting arm 542. Rotation of the drive shaft 510 causes rotation of the first door pivot arm 420. The door pivot connecting arm 440 is coupled to the second end 424. The first door pivot arm 420 includes a mounting portion 426. The mounting portion 426 is coupled to the first hinge member 210, such as by a pin. The first door pivot arm 420 pivots on the pin to move the door pivot connecting arm 440 and the door link assembly 414. In the illustrated embodiment, the first door pivot arm 420 is triangular shaped, however, the first door pivot arm 420 may have other shapes in alternative embodiments.

The second door pivot arm 430 extends between a first end 432 and a second end 434. The second end 434 is coupled to the door pivot connecting arm 440. Pivoting of the first door pivot arm 420 is transferred to the second door pivot arm 430 by the door pivot connecting arm 440. The door link assembly 414 is coupled to the first end 432. The second door pivot arm 430 includes a mounting portion 436. The mounting portion 436 may be approximately centered between the first end 432 and the second end 434. The mounting portion 436 is configured to be connected to the second hinge member 250. The second door pivot arm 430 may pivot relative to the second hinge member 250 on a pin to move the first end 432, and thus the door link assembly 414, as the door pivot assembly 412 is actuated. In the illustrated embodiment, the second door pivot arm 430 is Z-shaped, however, the second door pivot arm 430 may have other shapes in alternative embodiments.

The door pivot connecting arm 440 extends between a first end 442 and a second end 444. The first end 442 is coupled to the first door pivot arm 420, such as at the second end 424 by a pin. The door pivot connecting arm 440 may pivot relative to the first door pivot arm 420 during opening or closing of the door. The second end 444 is pinned to the second end 434 of the pivot arm 430. The door pivot connecting arm 440 may pivot relative to the second door pivot arm 430 during opening and closing of the door. In an exemplary embodiment, the door pivot connecting arm 440 is linear. However, the door pivot connecting arm 440 may have other shapes in alternative embodiments, such as being angular or being curved.

The door link arm 450 extends between a first end 452 and a second end 454. The first end 452 is configured to be coupled to the first door link connecting arm 460 and/or the second door link connecting arm 470. The door link arm 450 may pivot relative to the first and second door link connecting arms 460, 470. The second end 454 is configured to be coupled to the door bracket 126 (shown in FIG. 4). The door link arm 450 may pivot relative to the door bracket 126 during opening and closing of the door. In an exemplary embodiment, the door link arm 450 is linear. The door link arm 450 may have other shapes in alternative embodiments, such as being angular or being curved.

The first door link connecting arm 460 extends between a first end 462 and a second end 464. The first end 462 is configured to be coupled to the second door pivot arm 430. The first door link connecting arm 460 may pivot relative to the second hinge member 250. The second end 464 is configured to be coupled to the door link arm 450 and/or the second door link connecting arm 470. The first door link connecting arm 460 may pivot relative to the door link arm 450 during opening and closing of the door. In an exemplary embodiment, the first door link connecting arm 460 is linear. The first door link connecting arm 460 may have other shapes in alternative embodiments, such as being curved or being angular.

The second door link connecting arm 470 extends between a first end 472 and a second end 474. The second end 474 is configured to be coupled to the second hinge member 250. The second door link connecting arm 470 pivots around the joint with the second hinge member 250. The second door link connecting arm 470 may pivot relative to the second door pivot arm 430. The first end 472 is configured to be coupled to the door link arm 450 and/or the first door link connecting arm 460. The second door link connecting arm 470 may pivot relative to the door link arm 450 and/or the first door link connecting arm 460 during opening and closing of the door. The second door link connecting arm 470 influences the motion of the door link arm 450 and/or the first door link connecting arm 460 to help control their positions throughout the opening/closing motion. In an exemplary embodiment, the second door link connecting arm 470 is curved. The second door link connecting arm 470 may have other shapes in alternative embodiments, such as being angular or linear.

In operation, the door linkage assembly 410 controls movement of the door bracket 126, and thus the door 120, relative to the articulated hinge arm 202. For example, as the door is opened, the door bracket 126 pivots relative to the second hinge member 250.

Figure 12:
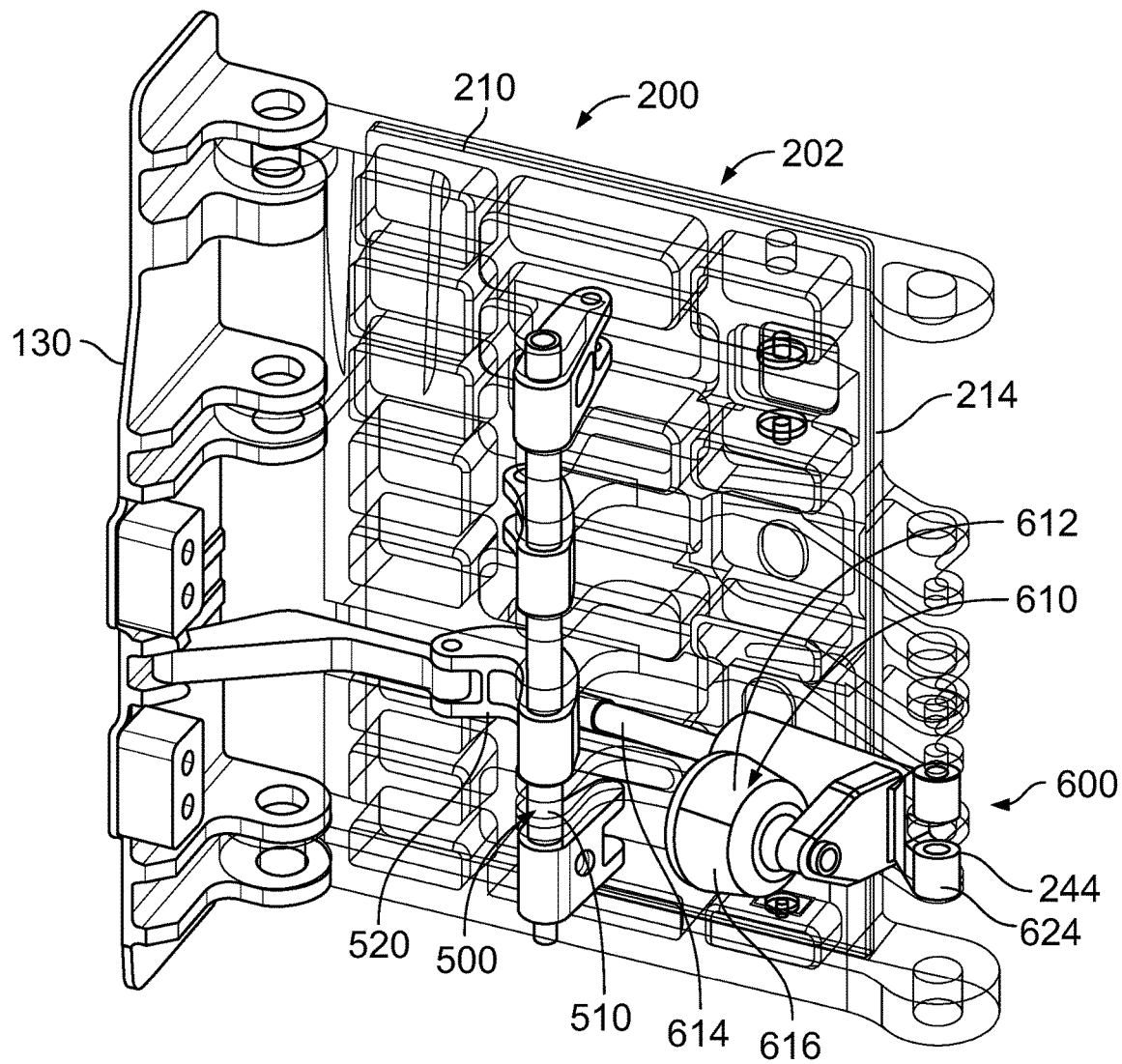
FIG. 12 is a rear perspective view of a portion of the articulated hinge assembly showing the drive assembly and a portion of the emergency power assist assembly in accordance with an exemplary embodiment.
Figure 13:
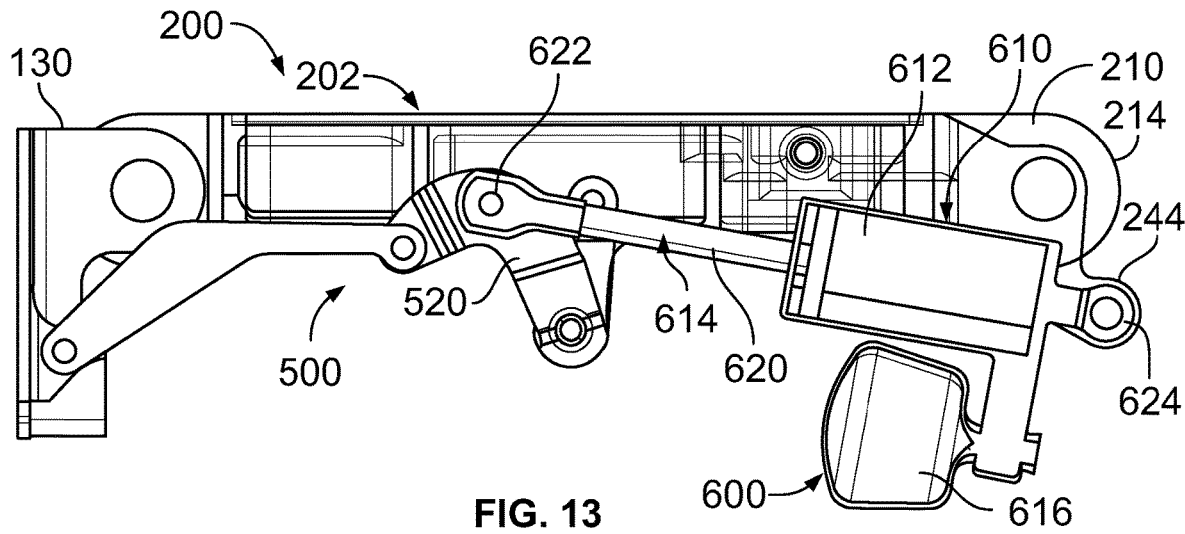
FIG. 13 is a top view of a portion of the articulated hinge assembly in accordance with an exemplary embodiment showing the drive assembly and a portion of the emergency power assist assembly.

FIG. 12 is a rear perspective view of a portion of the articulated hinge assembly 200 showing the drive assembly 500 and a portion of the emergency power assist assembly 600 in accordance with an exemplary embodiment. FIG. 13 is a top view of a portion of the articulated hinge assembly 200 in accordance with an exemplary embodiment showing the drive assembly 500 and a portion of the emergency power assist assembly 600. The emergency power assist assembly 600 is attached to the drive assembly 500 and the articulated hinge arm 202. In an exemplary embodiment, the emergency power assist assembly 600 is connected to the first hinge member 210. The emergency power assist assembly 600 is connected to the drive shaft 510 through the drive crank 520, however, the emergency power assist assembly 600 may be connected to another crank in alternative embodiments, such as the power assist assembly crank 550.

The emergency power assist assembly 600 is used to assist opening and/or closing of the door 120. In an exemplary embodiment, the emergency power assist assembly 600 includes an emergency drive assembly 610. The emergency drive assembly 610 includes an actuator 612 used to push against the drive assembly 500 and cause actuation of the linkage assembly 300 to assist opening the door 120 in an emergency. The actuator 612 may be a power driven actuator.

The emergency drive assembly 610 includes a piston 614 operably coupled to the actuator 612. The actuator 612 is used to move the piston 614 between a retracted position and an extended position. In various embodiments, the actuator 612 includes a pressure bottle 616 holding a pressurized gas, which is used to operate the actuator 612. For example, in an emergency situation, the high-pressure gas in the pressure bottle 616 is released to forcefully drive the piston 614. The actuator 612 may be operated to limit the rate of movement of the piston 614. In an exemplary embodiment, the actuator 612 is a pneumatic actuator. However, other types of actuators may be used in alternative embodiments, such as a hydraulic actuator, an electronic actuator, and the like.

In an exemplary embodiment, the piston 614 includes a piston rod 620 extending from a first end of the actuator 612. The piston rod 620 includes a connector mount 622 at the end of the piston rod 620. The connector mount 622 is configured to be coupled to the drive crank 520. In alternative embodiments, the connector mount 622 may be coupled to the first hinge member 210 or the second hinge member 250 (FIG. 6).

The actuator 612 includes a connector mount 624 at the second end of the actuator 612. The connector mount 624 is configured to be coupled to the first hinge member 210, such as to a mounting bracket 244 at the aft end 214. In alternative embodiments, the connector mount 624 may be coupled to the drive assembly 500. In operation, when the actuator is operated, the actuator 612 presses outward against the mounting bracket 244 and the piston 614 presses outward against the drive crank 520 to rotate the drive shaft 510. As the drive shaft 510 is rotated, the linkage assembly 300 is actuated to cause movement of the first and second hinge members 210, 250 and the door 120.

The emergency power assist assembly 600 is primarily used in emergency situations to provide force to assist opening the door 120 of the aircraft 100. For example, in emergency operation, if the inside door operating handle is actuated and the door structure is lifted beyond specified stops, the actuator 612 of the emergency power assist assembly 600 is operated to provide an opening assist force to drive the door 120 completely open very quickly. When activated, the emergency power assist assembly 600 forces the articulated hinge arm 202 to open relative to the door 120 which causes the rotation at the door bracket 126. Since the door bracket 126 is operably coupled to the fuselage bracket 130 via the linkage assembly 300, the overall result of the emergency power assist assembly 600 actuation is to drive the door 120 to the full open position.

Figure 14:
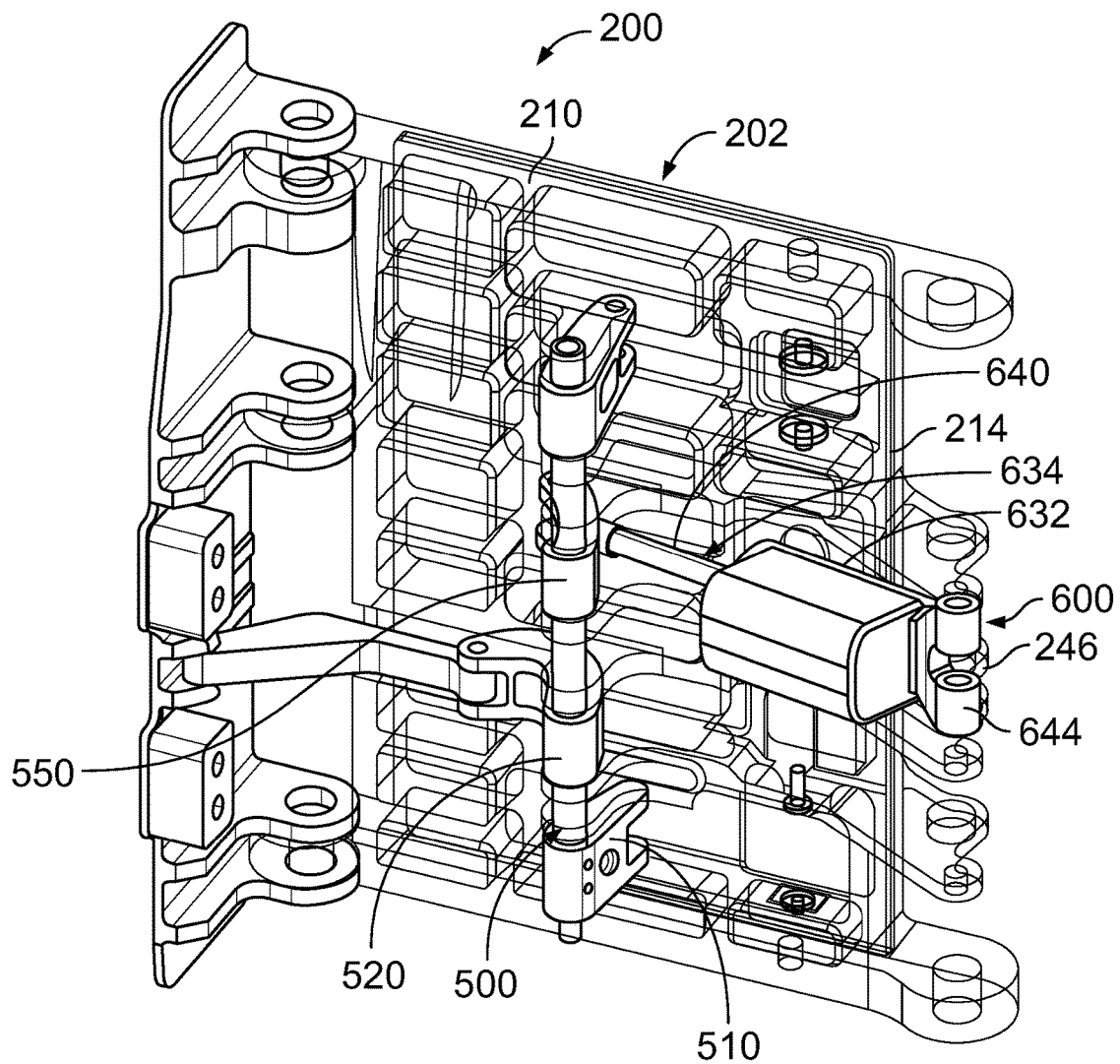
FIG. 14 is a rear perspective view of a portion of the articulated hinge assembly showing the drive assembly and a portion of the emergency power assist assembly in accordance with an exemplary embodiment.
Figure 15:
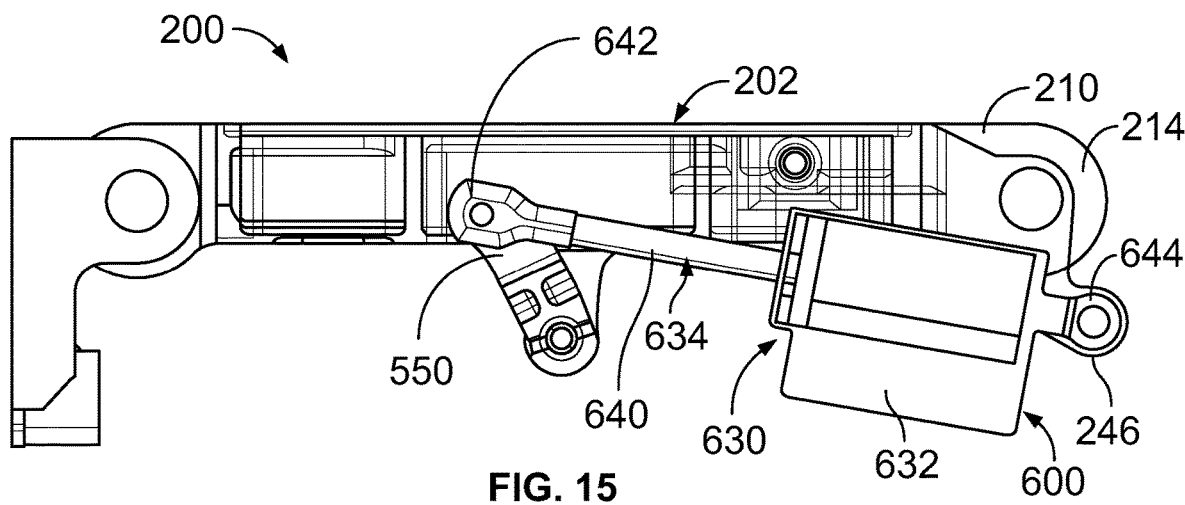
FIG. 15 is a top view of a portion of the articulated hinge assembly in accordance with an exemplary embodiment showing the drive assembly and a portion of the emergency power assist assembly.

FIG. 14 is a rear perspective view of a portion of the articulated hinge assembly 200 showing the drive assembly 500 and a portion of the emergency power assist assembly 600 in accordance with an exemplary embodiment. FIG. 15 is a top view of a portion of the articulated hinge assembly 200 in accordance with an exemplary embodiment showing the drive assembly 500 and a portion of the emergency power assist assembly 600. The emergency power assist assembly 600 is attached to the drive assembly 500 and the articulated hinge arm 202. In an exemplary embodiment, the emergency power assist assembly 600 is connected to the first hinge member 210. The emergency power assist assembly 600 is connected to the drive shaft 510 through the power assist assembly crank 550; however, the emergency power assist assembly 600 may be connected to another crank in alternative embodiments, such as the drive crank 520.

The emergency power assist assembly 600 is used to control opening and/or closing speed of the door 120. In an exemplary embodiment, the emergency power assist assembly 600 includes a damper assembly 630. The damper assembly 630 may be separate from the emergency drive assembly 610 (FIG. 12); however, in alternative embodiments the damper assembly 630 may be incorporated with the emergency drive assembly 610. The damper assembly 630 is used to limit the speed of the motion of the articulated hinge arm 202 and/or the door 120 when the door 120 is moved between the door closed position to the door open position (for example, to dampen the opening speed or the closing speed).

The damper assembly 630 includes a housing 632 holding a piston 634. The piston 634 is movable within the housing 632 between a retracted position and an extended position. In various embodiments, the damper assembly 630 is a hydraulic damper using hydraulic pressure to control the speed or rate of movement of the piston 634 within the housing 632 to control the door opening and closing rate. Other types of damper control may be used in alternative embodiments, such as pneumatic control, electric control, mechanical control, and the like.

In an exemplary embodiment, the piston 634 includes a piston rod 640 extending from a first end of the housing 632. The piston rod 640 includes a connector mount 642 at the end of the piston rod 640. The connector mount 642 is configured to be coupled to the power assist assembly crank 550. In alternative embodiments, the connector mount 642 may be coupled to the first hinge member 210 or the second hinge member 250 (FIG. 6).

The housing 632 includes a connector mount 644 at the second end of the housing 632. The connector mount 644 is configured to be coupled to the first hinge member 210, such as to a mounting bracket 246 at the aft end 214. In alternative embodiments, the connector mount 644 may be coupled to the drive assembly 500.

In various embodiments, the emergency power assist assembly 600 can provide damping for the door motion during operations. For example, if the speed of the door opening or closing motions becomes too great, the impact when the door 120 reaches travel limits could cause damage. The damper assembly 630 of the emergency power assist assembly 600 operates as a snubber feature to dampen, or restrict the speed of motion to an acceptable level.

FIG. 16 is a top view of the articulated hinge assembly 200 and the linkage assembly 300 in accordance with an exemplary embodiment in the collapsed position corresponding to the door closed position. FIG. 17 is a top view of the articulated hinge assembly 200 and the linkage assembly 300 in accordance with an exemplary embodiment in a partially expanded or partially collapsed position. FIG. 18 is a top view of the articulated hinge assembly 200 and the linkage assembly 300 in accordance with an exemplary embodiment in the expanded position corresponding to the door open position. The articulated hinge assembly 200 is shown mounted to the fuselage bracket 130 at the door opening 132 of the fuselage 106. The articulated hinge assembly 200 is shown mounted to the door bracket 126 at the door 120.

The articulated hinge assembly 200 causes the door 120 to swing outward along a programmed path from the door closed position (FIG. 16) to the door open position (FIG. 18). The door path may be a sweeping door path. For example, the door 120 may pivot approximately 160° between the door closed position and the door open position. In an exemplary embodiment, the exterior of the door 120 faces an exterior of the fuselage 106 in the door open position. The bumper 134 between the first hinge member 210 and the fuselage bracket 130 stops the first hinge member 210 in the door open position.

The first hinge member 210 is coupled to the fuselage bracket 130 and is configured to pivot on the fuselage bracket 130. The drive assembly 500 is coupled to the first hinge member 210 and the fuselage bracket 130. Rotation of the first hinge member 210 causes pivoting of the first hinge member 210. The linkage assembly 300 is coupled to the articulated hinge arm 202, the drive assembly 500, and the door bracket 126 to control movement of the articulated hinge arm 202 and the door 120 during opening and closing. The linkage assembly 300 controls pivoting of the first hinge member 210 relative to the second hinge member 250 during opening and closing of the door 120. For example, the hinge linkage assembly 310 is coupled to both the first hinge member 210 and the second hinge member 250 to control positioning of the first and second hinge members 210, 250 relative to each other. The second hinge member 250 is pivotably coupled to the first hinge member 210 at the connecting shaft 206. The linkage assembly 300 controls pivoting of the door 120 relative to the articulated hinge arm 202 during opening and closing of the door 120. For example, the door linkage assembly 410 is coupled to both the first hinge member 210 and the second hinge member 250 to control movement of the door 120.

The articulated hinge assembly 200 is moved between the folded or collapsed position (door closed position) and the expanded position (door open position). In the collapsed position (FIG. 16), the second hinge member 250 is folded inward and located between the first hinge member 210 and the door 120. The second hinge member 250 is parallel to the first hinge member 210 and located exterior of the first hinge member 210. The exterior surface 218 of the first hinge member 210 faces the second hinge member 250. In the extended position (FIG. 18), the first and second hinge members 210, 250 are angled relative to each other in the door open position. For example, the first and second hinge members 210, 250 may be in a generally perpendicular orientation. For example, the first hinge member 210 may be oriented at an angle between 85 and 105 degrees with the second hinge member 250 in the door open position.

The linkage assembly 300 is configured to cause the door 120 to move along a programed path as the door 120 moves from the door closed position to the door open position. For example, the geometry of the components (length and shape) of the links of the linkage assembly 300 and the connection points of the links to each other and to the articulated hinge arm 202 have been tailored to yield a desired or controlled motion (i.e. Programmed). The sizing, positioning, and orientations of the components of the linkage assembly 300 contribute to the programmability of the articulated hinge assembly 200. For example, the connection points between the linkages and the hinge members control the orientations of the hinge members relative to each other and relative to the fuselage as well as control the orientations of the door relative to the hinge members. The rotational and translational motions of the components of the linkage assembly 300 are transmitted through the various components to control the opening and closing of the door 120 relative to the fuselage 106.

In an exemplary embodiment, the articulated hinge assembly 200 has a low-profile relative to the door 120 into the interior of the passenger cabin. The components of the linkage assembly 300 are contained within the profile of the articulated hinge arm 202 so as to limit the space in the passenger cabin occupied by the articulated hinge assembly 200 and allow room for other elements within the space adjacent the door 120, such as passenger seats or additional galley space.

The articulated hinge arm 202 rotates relative to the fuselage 106 from the fully closed position to the fully open position. The articulated hinge assembly 200 maintains the orientation of the door 120 relative to the fuselage 106 through the range of motion. For example, the linkage assembly 300 causes the door 120 to swing open or closed. The links of the linkage assembly 300 rotate/pivot as the door 120 is moved from the closed position to the open position to control the orientation of the door 120 relative to the fuselage 106. The programmed or controlled rotation of the links maintains the door orientation. The articulated hinge arm 202 articulates between the first and second hinge members 210, 250 to allow the articulated hinge arm 202 to wrap around the edge of the door opening 132 to position the door 120 forward of the door opening 132 in the open position.

During operation, the door 120 can be opened by manually rotating a door handle (not shown) to unlock the door assembly, and manually applying a force to move the door 120 outward and forward. When the door 120 is opened, the articulated hinge arm 202 rotates about the fuselage bracket 130 and the door bracket 126. The second hinge member 250 is translated outward by the first hinge member 210, causing the door 120 to be swung away from the door opening 132. The linkage assembly 300 controls the orientation of the door 120 around the pivot point at the fuselage bracket 130 and at the door bracket 126 as the door 120 is opened and translated away from the fuselage 106. When the door is fully opened, the exterior of the door 120 is adjacent the outer skin of the aircraft 100 while the door 120 has been rotated out away from, and forward of, the door opening 132. When the door 120 is closed, the articulated hinge assembly 200 is pulled in the opposite direction. As a result, the door 120 is pivoted in the opposite direction. Thus, when the door 120 is moved into the door opening 132, the door is correctly seated.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 41 U.S.C. § 112(f), unless and until such claim limitations expressly use the phrase "means for" followed by a statement of function void of further structure.

What is claimed is:

1. An articulated hinge assembly for connecting a door to a fuselage of an aircraft, the articulated hinge assembly comprising:

an articulated hinge arm having a first hinge member and a second hinge member pivotably coupled to the first hinge member at an elbow, the first hinge member including a fuselage fitting configured to be pivotably coupled to a fuselage bracket mounted to the fuselage adjacent a door opening of the aircraft, the second hinge member including a door fitting configured to be pivotably coupled to a door bracket of the door, the articulated hinge arm movable from a collapsed position to an expanded position to move the door from a door closed position to a door open position, wherein the second hinge member is folded in on the first hinge member in the collapsed position, and wherein the second hinge member is moved away from the first hinge member in the expanded position; and a linkage assembly coupled to the articulated hinge arm, the fuselage fitting and the door fitting, the linkage assembly including a hinge linkage assembly coupled to the articulated hinge arm and the fuselage fitting, the hinge linkage assembly controlling movement of the first hinge member and the second hinge member relative to each other and relative to the fuselage fitting as the articulated hinge arm is moved from the collapsed position to the expanded position, the linkage assembly including a door linkage assembly coupled to the articulated hinge arm and the door to control positioning of the door relative to the second hinge member when the door is moved from the door closed position to the door open position, the linkage assembly configured to cause the door to move along a programed path relative to the fuselage as the door moves from the door closed position to the door open position.

2. The articulated hinge assembly of claim 1, wherein the linkage assembly is configured to cause the door to swing outward along the programed path relative to the fuselage such that an exterior of the door faces an exterior of the fuselage in the door open position.

3. The articulated hinge assembly of claim 1, wherein the second hinge member extends parallel to the first hinge member in the door closed position and wherein the first hinge member is oriented at an angle between 85 and 105 degrees with the second hinge member in the door open position.

4. The articulated hinge assembly of claim 1, wherein the second hinge member is located between the first hinge member and the door in the door closed position.

5. The articulated hinge assembly of claim 1, wherein the articulated hinge arm includes a connecting shaft at the elbow, the first and second hinge members being pivotably coupled to the connecting shaft.

6. The articulated hinge assembly of claim 1, wherein the hinge linkage assembly is coupled to both the first hinge member and the second hinge member and wherein the door linkage assembly is coupled to both the first hinge member and the second hinge member.

7. The articulated hinge assembly of claim 1, wherein the hinge linkage assembly includes a hinge pivot arm pivotably coupled to the first hinge member, a hinge connecting arm between the hinge pivot arm and a drive input, and a hinge link arm between the hinge pivot arm and the second hinge member.

8. The articulated hinge assembly of claim 7, wherein the hinge pivot arm includes a pivot axis at a first end of the hinge pivot arm, the hinge connecting arm coupled to a central portion of the hinge pivot arm, the hinge link arm coupled to the hinge pivot arm at a second end of the hinge pivot arm.

9. The articulated hinge assembly of claim 1, wherein the door linkage assembly includes a drive assembly, a door pivot assembly, and a door link assembly, the drive assembly including a door crank coupled to a drive shaft and being operably coupled to the door pivot assembly, the door pivot assembly being pivotably coupled to the articulated hinge arm, the door link assembly connected between the door pivot assembly and the door bracket.

10. The articulated hinge assembly of claim 9, wherein the door pivot assembly includes at least one door pivot arm pivotably coupled to the articulated hinge arm, the door link assembly including a door link arm connected to the door bracket, a first door link connecting arm connected between the door link arm and the at least one door pivot arm, and a second door link connecting arm connected between the second hinge member and the door link arm.

11. The articulated hinge assembly of claim 1, wherein the linkage assembly includes a drive shaft rotatably coupled to the first hinge member, the hinge linkage assembly including a hinge crank coupled to and rotatably with the drive shaft to drive the hinge linkage assembly, the door linkage assembly including a door crank coupled to and rotatable with the drive shaft to drive the door linkage assembly.

12. The articulated hinge assembly of claim 11, further comprising an emergency power assist assembly coupled to the first hinge member and coupled to the drive shaft to control rotation of the drive shaft.

13. The articulated hinge assembly of claim 1, further comprising an emergency power assist assembly attached between the linkage assembly and the articulated hinge arm so as to drive the door open in an emergency and to limit the speed of the motion of the articulated hinge arm when the articulated hinge arm is moved between the door closed position to the door open position.

14. The articulated hinge assembly of claim 1, further comprising a bumper coupled to the fuselage bracket, the bumper configured to stop the first hinge member in the door open position.

15. An articulated hinge assembly for connecting a door to a fuselage of an aircraft, the articulated hinge assembly comprising:
an articulated hinge arm having a first hinge member, a second hinge member, and a connecting shaft, the first and second hinge members being pivotably coupled to the connecting shaft at an elbow, the first hinge member extending between an forward end and an aft end, the aft end of the first hinge member being coupled to the connecting shaft, the first hinge member including a fuselage fitting at the forward end of the first hinge member configured to be pivotably coupled to a fuselage bracket mounted to the fuselage adjacent a door opening of the aircraft, the second hinge member including an aft end and an forward end, the aft end of the second hinge member being coupled to the connecting shaft, the second hinge member including a door fitting at the forward end of the second hinge member configured to be pivotably coupled to a door bracket of the door, the articulated hinge arm movable from a collapsed position to an expanded position to move the door from a door closed position to a door open position, wherein the second hinge member is folded in on the first hinge member in the collapsed position, and wherein the second hinge member is moved away from the first hinge member in the expanded position; and
a linkage assembly coupled to the articulated hinge arm, the fuselage fitting and the door fitting, the linkage assembly comprising:
a hinge linkage assembly coupled to the articulated hinge arm and the fuselage fitting, the hinge linkage assembly controlling movement of the first hinge member and the second hinge member relative to each other and relative to the fuselage fitting, the hinge linkage assembly including a hinge pivot arm pivotably coupled to the first hinge member, a hinge connecting arm between the hinge pivot arm and a hinge crank coupled to a drive shaft, and a hinge link arm between the hinge pivot arm and the second hinge member, the hinge pivot arm including a pivot axis at a first end of the hinge pivot arm, the hinge connecting arm coupled to a central portion of the hinge pivot arm, the hinge link arm coupled to the hinge pivot arm at a second end of the hinge pivot arm; and
a door linkage assembly coupled to the articulated hinge arm and the door to control positioning of the door relative to the second hinge member when the door is moved from a door closed position to a door open position, the door linkage assembly including a drive assembly, a door pivot assembly, and a door link assembly, the drive assembly including a door crank coupled to the drive shaft and being operably coupled to the door pivot assembly, the door pivot assembly being pivotably coupled to the articulated hinge arm, the door link assembly connected between the door pivot assembly and the door bracket, the door pivot assembly including at least one door pivot arm pivotably coupled to the articulated hinge arm, the door link assembly including a door link arm connected to the door bracket, a first door link connecting arm connected between the door link arm and the at least one door pivot arm, and a second door link connecting arm connected between the second hinge member and the door link arm, the linkage assembly configured to cause the door to move along a programed path relative to the fuselage as the door moves from the door closed position to the door open position.

16. The articulated hinge assembly of claim 15, wherein the linkage assembly is configured to cause the door to swing outward along the programed path relative to the fuselage such that an exterior of the door faces an exterior of the fuselage in the door open position.

17. The articulated hinge assembly of claim 15, wherein the second hinge member extends parallel to the first hinge member in the door closed position and wherein the first hinge member is oriented at an angle between 85 and 105 degrees with the second hinge member in the door open position.

18. The articulated hinge assembly of claim 15, wherein the second hinge member is located between the first hinge member and the door in the door closed position.

19. An articulated hinge assembly for connecting a door to a fuselage of an aircraft, the articulated hinge assembly comprising:
- an articulated hinge arm having a first hinge member and a second hinge member pivotably coupled to the first hinge member at an elbow, the first hinge member including a fuselage fitting configured to be pivotably coupled to a fuselage bracket mounted to the fuselage adjacent a door opening of the aircraft, the second hinge member including a door fitting configured to be pivotably coupled to a door bracket of the door, the articulated hinge arm movable from a collapsed position to an expanded position to move the door from a door closed position to a door open position, wherein the second hinge member is folded in on the first hinge member in the collapsed position, and wherein the second hinge member is moved away from the first hinge member in the expanded position;
- a linkage assembly coupled to the articulated hinge arm, the fuselage fitting and the door fitting, the linkage assembly including a hinge linkage assembly coupled to the articulated hinge arm and the fuselage fitting, the hinge linkage assembly controlling movement of the first hinge member and the second hinge member relative to each other and relative to the fuselage fitting, the linkage assembly including a door linkage assembly coupled to the articulated hinge arm and the door to control positioning of the door relative to the second hinge member when the door is moved from a door closed position to a door open position, the linkage assembly configured to cause the door to swing outward along a programed path relative to the fuselage such that an exterior of the door faces an exterior of the fuselage in the door open position.

20. The articulated hinge assembly of claim 19, wherein the second hinge member extends parallel to the first hinge member in the door closed position and wherein the first hinge member is oriented at an angle between 85 and 105 degrees with the second hinge member in the door open position, the second hinge member being located between the first hinge member and the door in the door closed position.

* * * * *